US008021752B2

(12) United States Patent
Honda et al.

(10) Patent No.: US 8,021,752 B2
(45) Date of Patent: Sep. 20, 2011

(54) EPOXY RESIN COMPOSITION FOR CARBON-FIBER-REINFORCED COMPOSITE MATERIAL, PREPREG, INTEGRATED MOLDING, FIBER-REINFORCED COMPOSITE SHEET, AND CASING FOR ELECTRICAL/ELECTRONIC EQUIPMENT

(75) Inventors: Shiro Honda, Ehime (JP); Ryuji Sawaoka, Ehime (JP); Koyomi Nakahara, Okayama (JP)

(73) Assignee: TORAY Industries, Inc., Tokyo (JP)

( * ) Notice: Subject to any disclaimer, the term of this patent is extended or adjusted under 35 U.S.C. 154(b) by 719 days.

(21) Appl. No.: 10/590,442

(22) PCT Filed: Feb. 24, 2005

(86) PCT No.: PCT/JP2005/003010
§ 371 (c)(1),
(2), (4) Date: Aug. 24, 2006

(87) PCT Pub. No.: WO2005/082982
PCT Pub. Date: Sep. 9, 2005

(65) Prior Publication Data
US 2008/0166511 A1  Jul. 10, 2008

(30) Foreign Application Priority Data

Feb. 27, 2004 (JP) ................................. 2004-053442
Oct. 21, 2004 (JP) ................................. 2004-306525

(51) Int. Cl.
*B32B 27/38* (2006.01)
*B32B 27/04* (2006.01)
*B32B 27/20* (2006.01)
*B32B 27/26* (2006.01)
*C08K 5/49* (2006.01)
*C08L 63/00* (2006.01)

(52) U.S. Cl. .................... 428/413; 428/297.4; 523/451; 525/523

(58) Field of Classification Search .................. None
See application file for complete search history.

(56) References Cited

U.S. PATENT DOCUMENTS

| 3,386,956 A | * | 6/1968 | Nawakowski et al. | 528/119 |
| 5,087,657 A | * | 2/1992 | Qureshi et al. | 524/508 |
| 5,269,863 A | * | 12/1993 | Middelman | 156/177 |
| 5,859,097 A | * | 1/1999 | Bruynseels et al. | 523/427 |
| 5,994,429 A | * | 11/1999 | Honda et al. | 523/451 |
| 6,201,074 B1 | | 3/2001 | Von Gentzkow et al. | 525/525 |
| 2003/0135011 A1 | * | 7/2003 | Goto et al. | 528/93 |
| 2004/0034127 A1 | | 2/2004 | Taguchi et al. | 523/400 |

FOREIGN PATENT DOCUMENTS

| JP | 9-323372 A | 12/1997 |
| JP | 10-110087 A | 4/1998 |
| JP | 2002-256041 A | 9/2002 |
| JP | 2003-20410 A | 1/2003 |
| JP | 2004-269878 A | 9/2004 |

* cited by examiner

Primary Examiner — Michael J Feely
(74) Attorney, Agent, or Firm — Kubovcik & Kubovcik

(57) ABSTRACT

The present invention provides a light-weight fiber-reinforced composite material that has excellent flame retardance and mechanical properties and never emits a halogen gas. The present invention also provides a prepreg and an epoxy resin composition suited to obtain the above described fiber-reinforced composite material. The present invention also provides an integrated molding which is produced using the above described fiber-reinforced composite material, thereby suitable for use in electric/electronic casings. The epoxy resin composition is such that it contains the following components [A], [B], [C], [D], and [E]: [A] epoxy resin, [B] amine curing agent, [C] phosphorus compound, [D] curing accelerator, and [E] thermoplastic resin, wherein the resin composition has a phosphorus atom concentration of 0.2 to 15% by weight.

11 Claims, 6 Drawing Sheets

US 8,021,752 B2

EPOXY RESIN COMPOSITION FOR CARBON-FIBER-REINFORCED COMPOSITE MATERIAL, PREPREG, INTEGRATED MOLDING, FIBER-REINFORCED COMPOSITE SHEET, AND CASING FOR ELECTRICAL/ELECTRONIC EQUIPMENT

This application is a 371 of international application PCT/JP2005/003010, which claims priority based on Japanese patent application Nos. 2004-053442 and 2004-306525 filed Feb. 27 and Oct. 21, 2004, respectively, which are incorporated herein by reference.

TECHNICAL FIELD

The present invention relates to an epoxy resin composition suitable for use as a matrix resin for a carbon-reinforced composite material. In particular, the present invention relates to an epoxy resin composition capable of providing a light-weight cured resin having superior flame retardance and mechanical properties, a prepreg containing the epoxy resin composition, and a fiber-reinforced composite sheet comprising the cured epoxy resin and carbon fiber.

Further, the present invention relates to an integrated molding suitable for use as cases for electrical/electronic equipment.

BACKGROUND ART

Fiber-reinforced composite materials, particularly carbon-fiber-reinforced composite materials, which comprise carbon fiber and a matrix resin, have wide applications not only in the field of sporting goods such as golf clubs, tennis rackets and fishing rods, but also in the fields of structural materials for aircrafts or vehicles and of reinforcement of concrete structures, because of their superior mechanical properties. In recent years, carbon-fiber-reinforced composite materials have been used for cases of electrical/electronic equipment such as note-type personal computers and video cameras, because of the electrical conductivity of carbon fiber and their superior electromagnetic shielding properties and mechanical properties, contributing to providing thinner-wall casings or lighter-weight equipment.

In one of such applications of fiber-reinforced composite materials, that is, in the application in the field of structural materials for aircrafts or vehicles or of building materials, it is strongly required that fiber-reinforced composite materials have flame retardance, because it is very dangerous that structural materials catch fire and burn and emit toxic gases.

In the applications in the field of electrical/electronic equipment, it is also required that the materials have flame retardance, because accidents, such as ignition or burning of equipment casings or parts, may occur when the materials are exposed to heat developed inside the equipment or high temperatures outside the equipment.

Traditionally, halogen flame-retardants have been widely used to impart flame retardance to fiber-reinforced composite materials. Specifically, there are disclosed flame-retardant epoxy resin compositions using, as a flame-retardant, a brominated epoxy resin or a brominated epoxy resin together with antimony trioxide (e.g. JP Patent Publication (Kokoku) Nos. 59-2446B (1984) and 59-52653B (1984), JP Patent Publication (Kokai) Nos. 6-206980A (1994) and 9-278914A (1997)). There are also disclosed flame-retardant epoxy resin compositions and prepregs using, as a flame-retardant, an organic halogen compound such as hexabromobenzene (e.g. JP Patent No. 3216291).

These halogen flame-retardants produce a high flame-retardant effect, but on the other hand, they can sometimes generate a noxious gas, such as hydrogen halide or organic halogen compound, during the time that composite materials catch fire and the fire is extinguished. And it is known that incineration of plastic materials containing a halogen flame-retardant at insufficiently high temperatures emits dioxins, which are carcinogens. Furthermore, antimony trioxide, which is used together with a halogenated flame-retardant, is hazardous due to its irritant action, and care must be taken when handling it. Thus, there have been demands in recent years that a certain level of flame retardance should be achieved without using a halogen flame-retardant or antimony trioxide.

Further, halogen flame-retardants have a halogen atom as an integral part of molecule, and thus, their specific gravity itself is as high as about 1.9, while that of ordinary cured epoxy resins is about 1.2 (specific gravities herein described are all those measured at 25° C.). Furthermore, the specific gravity of antimony trioxide, which is used together with a halogen flame-retardant, is as high as 5.2. Thus, a cured resin obtained by curing a resin composition having any of these flame-retardants added has a higher specific gravity than a cured resin obtained by curing a resin composition having none of such flame-retardants added. This, in general, results in increase in the specific gravity of fiber-reinforced composite materials produced using, as a matrix resin, a resin composition having any of these flame-retardants added and may cause the problem of being unable to make full use of the characteristics of fiber-reinforced composite materials, light weight and high stiffness.

In the meantime, as a technique for providing halogen-free flame-retardant epoxy resin compositions, there is disclosed a technique where a matrix resin for fiber-reinforced composite materials is made up of: epoxy resin, metal oxide and thermoplastic resin having a glass transition temperature of 120° C. or higher (e.g. JP Patent Publication (Kokai) No. 11-147965A (1999)). This technique has the advantage of not emitting a halogen gas, but on the other hand, it requires 20 parts or more of metal oxide to be added to achieve sufficient flame retardance. Resin compositions containing a large amount of such a flame retardant have so high viscosity that they are hard to impregnate into reinforcing fiber, which is likely to have a detrimental effect on handleability of prepregs, to allow the formation of voids in the molded composite materials, and to cause deterioration in physical properties of the composite materials, particularly in tensile properties.

Further, metal oxides have a high specific gravity, like halogen flame-retardants. For example, magnesium oxide has a specific gravity of 3.2 or more, and thus, addition of such a compound as a flame-retardant causes the problem of increasing the specific gravity of the resultant resin compositions and fiber-reinforced composite materials, just like the problem with halogen flame-retardants.

As described so far, in the present state of art, it is hard to obtain a light-weight non-halogen flame-retardant epoxy resin composition which allows fiber-reinforced composite materials to have superior mechanical properties.

For casings or members of electrical/electronic equipment and information equipment such as note-type personal computer, cellular phone, mobile information terminal and digital camera, thermoplastic resins have been used. In recent years, with the quick spread of such equipment, there have been increasing demands for thin and light weight products in the market. And with the increase in such demands, casings and internal members that constitute the products have been required to be not only of thin wall and light weight, but of high strength and high stiffness.

To meet this requirement, magnesium alloys have been put to practical use. But on the other hand, there have been increasing requirement for high stiffness, and to meet this increasing requirement, consideration has been given to using metallic materials having high stiffness, such as aluminum alloys. From these metallic materials, however, members or products having a complicated shape are hard to produce in large quantity and easily, and at the same time, due to high specific gravity of such metallic materials, the requirement of light weight has not been satisfied yet.

On the other hand, fiber-reinforced composite materials (FRPs), each of which is made up of matrix resin and continuous reinforcing fiber arranged in the matrix resin, particularly carbon-fiber-reinforced composite materials (CFRPs), in which carbon fiber is used as the reinforcing fiber, have been widely used, as materials excellent in mechanical properties and light-weight, in the production of various kinds of parts or structures. These FRPs are, however, poorly suited to producing parts or structures having a complicated shape in a single molding step; therefore, in the above described applications, the production process requires the steps of: forming members of FRP; and integrate the formed members with other members.

Materials used for applications, such as electrical/electronic equipment or information equipment, are sometimes strongly required to have flame retardance so as to prevent accidents such as ignition or burning of equipment casings or parts, which may occur when the casings or parts are exposed to heat developed inside the equipment or high temperatures outside the equipment. As thermoplastic resin materials used for such application, those blended with various types of flame-retardants are generally known. For example, there are disclosed conductive casings for electronic equipment which are produced by injection-molding resin compositions composed of carbon fiber, semiaromatic polyamide, aliphatic polyamide, and red phosphorus as a flame-retardant (e.g. JP Patent Publication (Kokai) No. 10-120798 (1998)).

As described above, to impart flame retardance to fiber-reinforced composite materials, halogen flame-retardants have been widely used. For example, there are disclosed carbon-fiber-reinforced composite materials in which brominated epoxy resin and antimony trioxide as a flame-retardant are used (e.g. JP Patent Publication (Kokai) No. 9-278914 (1997)). This flame-retardant, however, has the problem of its use for the above described applications being restricted due to it noxiousness to the environment and the human body.

There are also disclosed fiber-reinforced composite materials in which an epoxy resin composition is used as a matrix resin and magnesium oxide or aluminum oxide as a non-halogen flame-retardant (e.g. JP Patent Publication (Kokai) No. 11-147965 (1999)). However, to achieve sufficient flame retardance by this known technique, a large amount of flame-retardant needs to be added. Addition of a large amount of flame-retardant increases the viscosity of the resin composition, thereby giving rise to the problem of causing molding faults, such as void formation, which leads to deterioration in mechanical properties. Further, since such a flame-retardant has a high specific gravity, addition of a large amount of flame-retardant gives rise to the problem of failing to impart superior light weight to the final composite materials.

As described so far, in the present state of art, moldings in which members of FRP are integrated do not satisfy not only mechanical properties and light weight, but also superior flame retardance, which are required when they are used for the above described applications.

The present invention has been made in the light of the above described problems with prior art. Accordingly, a primary object of the present invention is to provide a light-weight fiber-reinforced composite material which has superior flame retardance and mechanical properties and never emits a halogen gas when it is incinerated, and a prepreg and an epoxy resin composition both suited to obtain such a fiber-reinforced composite material.

Another object of the present invention is to provide an integrated molding in which not only high mechanical properties and light weight, but also superior flame retardance is accomplished without using a halogen flame-retardant and which is suitable for use as a casing for electrical/electronic equipment.

DISCLOSURE OF THE INVENTION

To overcome the above described problems, the present invention provides an epoxy resin composition for carbon-fiber-reinforced composite materials which contains the following components [A], [B] and [C], wherein the concentration of the component [C] is 0.2 to 15% by weight in terms of phosphorus atom concentration.

[A] Epoxy resin
[B] Amine curing agent
[C] Phosphorus compound

The present invention also provides a prepreg prepared by impregnating carbon fiber with the epoxy resin composition for carbon-fiber-reinforced composite materials described above.

The present invention also provides a fiber-reinforced composite material comprising a cured resin prepared by curing the epoxy resin composition for carbon-fiber-reinforced composite materials described above; and carbon fiber.

The present invention also provides an integrated molding in which a member (I), which includes a fiber-reinforced composite sheet made up of (a) continuous reinforcing fiber, (b) a matrix resin composition containing a thermosetting resin as a major component and (c) a flame-retardant, is joined with another member (II), wherein the flame retardance of the member (I) is UL-94 V-1 or V-0 for test pieces having a substantial thickness of the member (I).

The present invention also provides a fiber-reinforced composite sheet (A) comprising (a) continuous reinforcing fiber, (b) a matrix resin composition containing a thermosetting resin as a major component and (c) a flame-retardant, which includes (d) a thermoplastic resin layer with at least part of its surface provided with unevenness, wherein the flame retardance in accordance with UL-94 of the sheet is V-1 or V-0 for test pieces having a substantial thickness of the sheet.

According to the present invention, it is possible to obtain a light-weight fiber-reinforced composite material which has superior flame retardance and mechanical properties and never emits a halogen gas when it is incinerated, and a prepreg and an epoxy resin composition suited to obtain such a fiber-reinforced composite material.

The integrated molding and fiber-reinforced composite sheet of the present invention are advantageous in production of thinner-wall and lighter-weight parts or equipment, due to their superior mechanical properties and light weight, and besides, they can be suitably used for note-type personal computers or mobile information terminals, due to their superior flame retardance.

DESCRIPTION OF REFERENCE NUMERALS AND CHARACTERS

Figure 1:
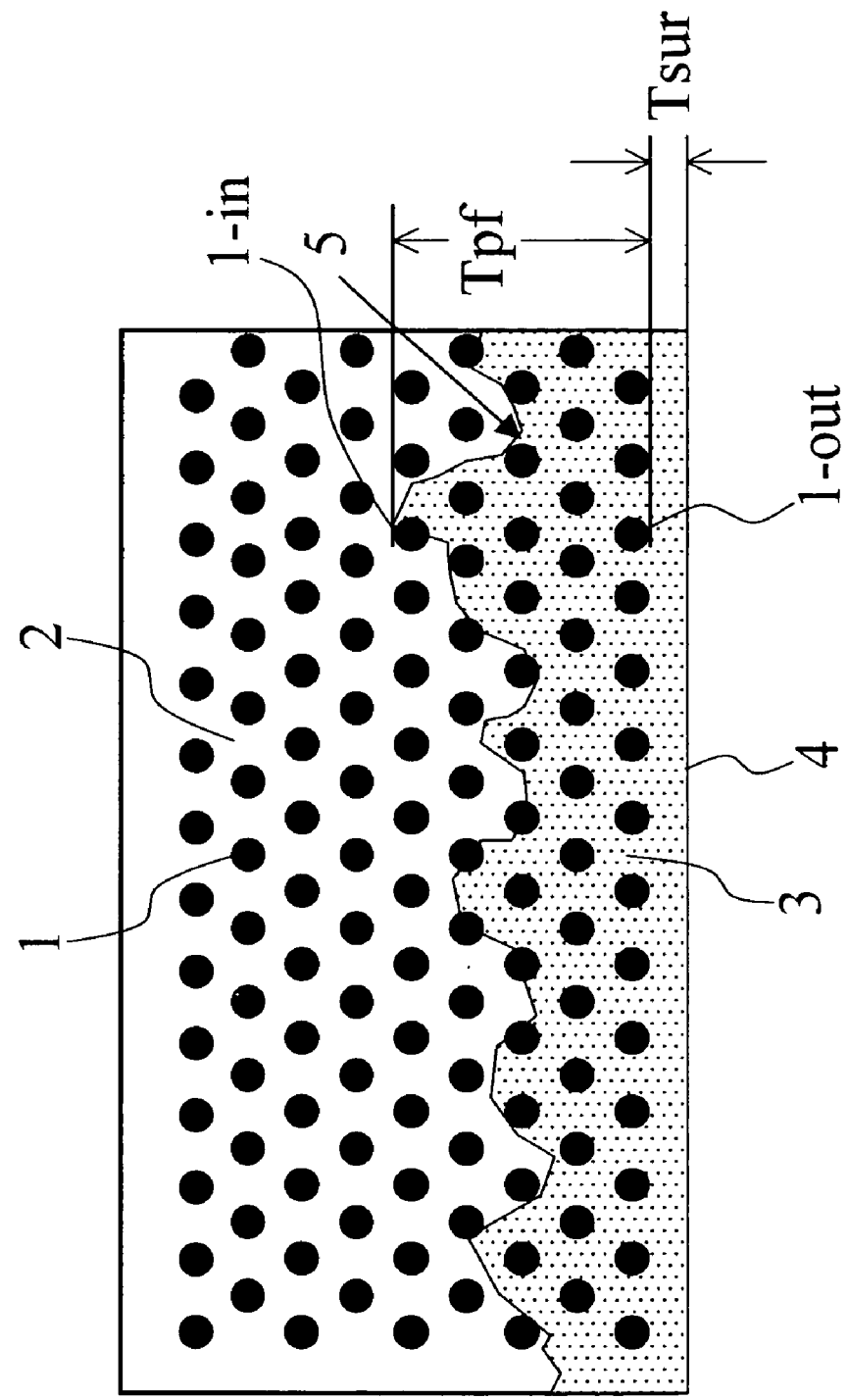
FIG. 1 is a schematic cross-sectional view illustrating one example of fiber-reinforced composite sheets of the present invention.
Figure 2:
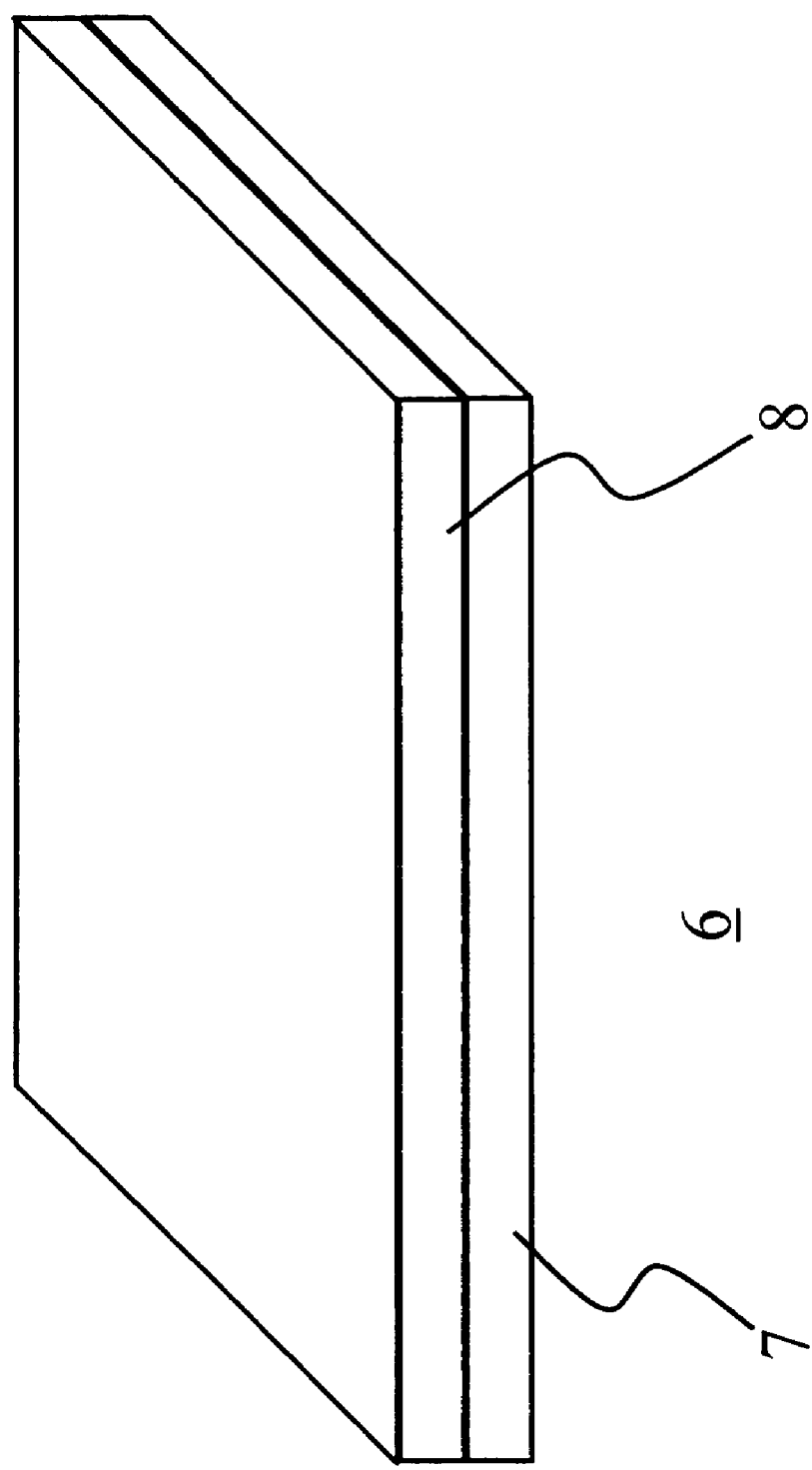
FIG. 2 represents a sample for evaluation of bonding strength in the vertical direction.

1: Reinforcing fiber
1-in: Innermost reinforcing fiber in contact with thermoplastic resin coating layer 3
1-out: Outermost reinforcing fiber in contact with thermoplastic resin coating layer 3
2: Thermosetting resin
3: Thermoplastic resin coating layer
4: Surface of fiber-reinforced composite sheet
5: Interface of thermosetting resin and thermoplastic resin coating layer
Tpf: Maximum thickness of unevenness of coating layer
Tsur: Distance between 1-out and surface 4
6: Sample for use in evaluation of bonding strength in the vertical direction
7: Fiber-reinforced composite sheet
8: Another member (II)
9a: Tensile jig
9b: Tensile jig
10: Bonded surface
11a: Arrow showing the tensile direction
11b: Arrow showing the tensile direction
12: Casing of note-type personal computer
13: Fiber-reinforced composite sheet constituting the casing of note-type personal computer
14: Another member (II) constituting the casing of note-type personal computer
15: Casing of cellular phone display
16: Fiber-reinforced composite material constituting the casing of cellular phone display
17: Another member (II) constituting the casing of cellular phone display
18: Length of test piece
19: Width of test piece
20: Test piece
21: Joining portion
22: Length of joining portion

BEST MODE FOR CARRYING OUT THE INVENTION

The epoxy resin composition of the present invention includes the following components [A], [B] and [C].
[A] Epoxy resin
[B] Amine curing agent
[C] Phosphorus compound The phosphorus atom concentration in the epoxy resin composition needs to be 0.2 to 15% by weight.

The flame retardant effect of phosphorus atom, which is attributed to its carbide-formation accelerating action, is greatly affected by the concentration of phosphorus atom in the resin composition. If the concentration of phosphorus atom is lower than 0.2% by weight, sufficient flame retardant effect may not be produced, while the concentration is higher than 15% by weight, the mechanical properties, particularly the tensile strength and Charpy impact strength of the resultant composite material can sometimes be affected adversely. The concentration of phosphorus atom is preferably 0.3 to 13% by weight, more preferably 0.4 to 11% by weight and much more preferably 0.5 to 10% by weight.

Any phosphorus compound may be included in the epoxy resin composition, as long as the compound contains phosphorus as an integral part of molecule; however, preferably used is a phosphorus-containing compound, such as a phosphate ester, condensed phosphate ester or phosphaphenantrene compound, or red phosphorus. The phosphorus compounds described above may be entrapped into the epoxy resin skeleton during the curing reaction or may be dispersed in or compatible with the epoxy resin composition.

Red phosphorus has a specific gravity as small as 2.2, compared with that of metal oxides. And it has a very high content of phosphorus atoms, which have the effect of imparting flame retardance to the epoxy resin composition, and therefore, the use of red phosphorus as a flame-retardant makes it possible to add only a small amount of flame-retardant to obtain satisfactory flame retardant effect. Thus, the cured resin and fiber-reinforced composite material obtained by adding red phosphorus, as a flame-retardant, has a low specific gravity, which means that the merit of the epoxy resin composition of the present invention, that is, the merit that can provide a lighter-weight fiber-reinforced composite material can be made full use of. Further, since the amount of the flame-retardant added can be kept small, controlling the rheology of the epoxy resin composition is made easier. In this respect, the use of red phosphorus is particularly preferable. The rheology of the epoxy resin composition affects the moldability of the composition when the composition is used to obtain a fiber-reinforced composite material via a prepreg as an intermediate product or by a process, such as resin transfer molding process, in which a resin is injected into a mold.

Red phosphorus highly stabilized by coating its surface with a metal hydroxide and/or a resin is more preferably used. Examples of metal hydroxides used include: aluminum hydroxide, magnesium hydroxide, zinc hydroxide and titanium hydroxide. Neither kind nor amount of the resin coated is limited to specific one. However, as the resin, one having a high affinity for the epoxy resin as the base resin, such as phenolic resin, epoxy resin or polymethylmethacrylate, is preferable. And the amount of the resin coating is preferably 1% by weight or more per 100% of red phosphorus. If the amount is less than 1% by weight, satisfactory coating effect cannot be produced, whereby phosphine gas might be generated during kneading at high temperatures. From the viewpoint of stability, the larger the amount of the coating, the better; however, from the viewpoint of flame retardant effect and of decrease in weight of fiber-reinforced composite material, preferably the amount of coating is not more than 20% by weight.

Phosphate esters and condensed phosphate esters have a low content of phosphorus atom, compared with red phosphorus. Accordingly, to obtain the same level of flame retardant effect as that produced by red phosphorus, they must be added in an amount slightly larger than that of red phosphorus. However, phosphate esters and condensed phosphate esters have a specific gravity of about 1.2, which is almost the same as or lower than that of the cured epoxy resin before a flame-retardant is added, and therefore, they can impart flame retardance such cured epoxy resin without increasing the specific gravity of the resultant cured resin and fiber-reinforced composite material. Further, since many of commercially available phosphate esters and condensed phosphate esters are liquid at ordinary temperature, the use of them can prevent the deterioration in mechanical properties of the resultant composite material, which may be caused when a metal hydroxide is used, thereby making it possible to obtain a fiber-reinforced composite material having excellent properties.

When a powdered phosphorus compound is used, the maximum particle size of the compound is preferably 200 μm or smaller. If the compound has a particle size larger than 200 μm, its dispersibility in a resin might deteriorate or its passage through a prepreg production process might be adversely affected. The maximum particle size of the compound is more preferably 150 μm or smaller. The term "maximum particle size" herein used means the maximum particle size detected in particle size distribution measurement, and the particles size distribution measurement can be made using laser diffraction particle size analyzer.

Preferably a powdered phosphorus compound having an average particle size in the range of 0.1 to 70 μm is used. The use makes it possible not only to enhance the compound's dispersibility in an epoxy resin and decrease variations in moldability, flame retardance, etc., but to develop effective flame retardance even when only a small amount of the compound is used. A powdered phosphorus compound having an average particle size in the range of 0.5 to 50 μm is more preferably used. The term "average particle size" herein used means the volume average particle size, which can be measured using laser diffraction particle size analyzer.

Concrete examples of phosphate esters include: triallyl phosphates, alkyl allyl phosphates, alkyl phosphates and phosphonates. Examples of triallyl phosphates include: triphenyl phosphate, tricresyl phosphate, trixylyl phosphate, cresyl diphenyl phosphate, cresyl di-2,6-xylenyl phosphate and hydroxyl diphenyl phosphate. Examples of alkyl allyl phosphates include: octyl diphenyl phosphate. Examples of alkyl phosphates include: trimethyl phosphate, triethyl phosphate, tri-n-butyl phosphate, tri-isobutyl phosphate and tris (2-methylhexyl)phosphate. Examples of phosphonates include: dimethyl methyl phosphonate.

Examples of condensed phosphate esters include: resorcinol bis(diphosphate) and bisphenol A bis-(diphenylphosphate).

Of these phosphorus compounds, a compound having the highest possible phosphorus atom content per molecule is preferably used.

Phosphate esters and condensed phosphate esters applicable are not limited to the above concrete examples.

Any of these phosphorus compounds may be used individually or in combination, or may be used in the form of masterbatch, which is prepared in advance by kneading with a resin or the like.

The epoxy resin (component [A]) contained in the epoxy resin composition of the present invention can be any epoxy resin as long as the compound contains 2 or more epoxy groups. Examples of such epoxy resins include: bisphenol A epoxy resin; bisphenol F epoxy resin; bisphenol S epoxy resin; novolak epoxy resin; naphthalene epoxy resin; novolak epoxy resin; epoxy resin having a fluorine skeleton; epoxy resin produced from a copolymer of a phenol compound and dicyclopentadiene, as a raw material; glycidyl ether epoxy resin compositions such as diglycidyl resorcinol, tetrakis(glycidyloxyphenyl)ethane and tris(glycidyloxyphenyl)methane; glycidyl amine epoxy resins such as tetraglycidyl diamino diphenyl methane, triglycidyl amino phenol, triglycidyl amino cresol, and tetraglycidyl xylenediamine; biphenyl epoxy resin; isocyanate-modified epoxy resin; and the mixtures thereof. Any of these epoxy resins may be used individually or in the form of a mixture. When a composite material that offers a good balance of heat resistance and mechanical properties is required, preferably a polyfunctional epoxy resin and a bifunctional epoxy resin are used in combination. For example, phenol novolak epoxy resin, as a polyfunctional epoxy resin, and bisphenol A epoxy resin or bisphenol F epoxy resin, as a bifunctional epoxy resin, are used in combination.

The curing agent contained in the epoxy resin composition of the present invention is an amine curing agent (component [B]). An amine curing agent means a curing agent that includes a nitrogen atom as an integral part of molecule. Examples of such curing agents include: not limited to as long as they include a nitrogen atom as an integral part of molecule, aromatic polyamine compounds having active hydrogen, such as 4,4'-diaminodiphenylmethane, 4,4'-diaminodiphenylsulfon, 3,3'-diaminodiphenylsulfon, m-phenylenediamine, m-xylylenediamine and diethyltoluenediamine; aliphatic amines having active hydrogen, such as diethylenetriamine, triethylenetetramine, isophoronediamine, bis(aminomethyl)norbornane, bis(4-aminocyclohexyl)methane and dimeric esters of polyethylene-imine; modified amines obtained by allowing the amines having active hydrogen described above to react with a compound such as an epoxy compound, acrylnitrile, phenol and formaldehyde, or thiourea; tertiary amines having no active hydrogen, such as dimethylaniline, dimethylbenzylamine, 2,4,6-tris(dimethylaminomethyl)phenol and mono-substituted imidazole; polycarboxylic acid hydrazides such as dicyandiamide, tetramethylguanidine, adipic acid hydrazide and naphthalenecarboxylic acid hydrazide; and Lewis acid complexes such as ethylamine complex of boron trifluoride.

For applications where high heat resistance is required, an aromatic polyamine is particularly preferably used. Curing using an aromatic polyamine requires a temperature as high as about 180° C., but on the other hand, it provides cured resins of high modulus of elasticity and heat-resistance, and thus, a fiber-reinforced composite material using such a cured resin as a matrix resin is suitable for use as structural materials for aircrafts or vehicles. Of aromatic polyamines, 3,3'-diaminodiphenylsulfon and 4,4'-diaminodiphenylsulfon are particularly preferable, because they provide fiber-reinforced composite materials of high heat-resistance, particularly of high moisture-resistance and heat-resistance, and besides, their shelf stability becomes excellent when they are mixed into an epoxy resin to take the form of a "one-pack" type.

These curing agents can be used in combination with an appropriate curing accelerator to enhance their curing activity. For example, dicyandiamide is suitably used in combination with, as a curing accelerator, a urea derivative, such as 3-phenyl-1,1-dimethylurea, 3-(3,4-dichlorophenyl)-1,1-dimethylurea (DCMU), 3-(3-chloro-4-methylphenyl)-1,1-dimethylurea or 2,4-bis(3,3-dimethylureido)toluene, or an imidazole derivative. If dicyandiamide alone is used, curing requires a temperature as high as about 170 to 180° C., while if dicyandiamide is used together with any of curing accelerators described above, curing can be carried out at a temperature of about 80 to 150° C. The combination of dicyandiamide with a compound that contains two or more urea bonds per molecule is particularly preferable. Of the compounds that contain two or more urea bonds per molecule, 1,1'-(4-methyl-m-phenylene)bis(3,3-dimethylurea) or 4,4'-methylene bis(phenyldimethylurea) is preferable. Use of such a compound makes it possible to achieve curing at 150 to 160° C. for about 2 to 10 minutes. Besides, it improves flame retardance greatly when the cured resin is molded into thin panels, and thus, such a curing accelerator is preferably used for applications such as electrical/electronic materials.

A combination of an aromatic amine and ethylamine complex of boron trifluoride as a curing accelerator can also be mentioned.

For applications where low-temperature curability is required, a latent curing agent whose curing agent is activated at 70 to 125° C. is preferably used. The term "activated at 70 to 125° C." herein used means that the reaction initiation temperature is in the range of 70 to 125° C. The reaction initiation temperature (hereinafter referred to as activating temperature) can be obtained by differential scanning calorimetry (DSC). Specifically, DSC experiment is carried out for an epoxy resin composition which is prepared by adding 10 parts by weight of curing agent, as an object of evaluation, to 100 parts by, weight of bisphenol A epoxy resin having an epoxy equivalent of about 184 to 194 and the DSC curve of the composition is obtained. In the DSC curve, two tangent lines are drawn: one to the exthotherm curve at the inflection point and the other to the base line. The activating temperature can be obtained from the intersection of the two tangent lines. If the activating temperature of a latent curing agent is lower than 70° C., the shelf stability of the latent curing agent may sometimes be insufficient, while if the activating temperature is higher than 125° C., expected rapid cure property may not sometimes be obtained.

Examples of latent curing agents that are activated at 70 to 125° C. include: not limited to, as long as their activating temperature is in such a range, amine adduct latent curing agents; microcapsule-type latent curing agents; amineimides; blocked isocyanates; compounds whose epoxy group has converted into oxazolidinone ring by the reaction with carbamic acid ester; vinyl ether blocked carboxylic acids; salts of imidazole and carboxylic acids; carbamic acid salts of amines, and onium salts.

The term "amine adduct latent curing agent" herein used means an active component, such as compounds having a primary, secondary or tertiary amino group or various imidazole compounds, which has been converted into a high-molecular-weight compound through the reaction with some compound reactive with it, thereby having been insolubilized at storage temperature. Examples of amine adduct latent curing agents include: "AMICURE" (registered trademark) PN-23, MY-24 (manufactured by Ajinimoto-Fine-Techno Co., Inc.); "Adeka Hardner" (registered trademark) EH-3293S, EH-3615S, EH-4070S (manufactured by ASAHI DENKA Co., Ltd.); and "FUJICURE" (registered trademark) FXE1000, FXR-1020 (manufactured by FUJI KASEI KOGYO Co., Ltd.). Examples of microcapsule-type latent curing agents applicable include "Novacure" (registered trademark) HX-3721, HX-3722 (manufactured by Asahi Kasei Corporation). Of these latent curing agents, "AMICURE" PN-23, an amine adduct latent curing agent, is preferably used, because it has excellent shelf stability at room temperature and noticeable rapid cure property.

The term "microcapsule-type latent curing agent" means a latent curing agent prepared by coating a curing agent, as a core, with a polymer such as an epoxy resin, polyurethane resin, polystyrene or polyimide or cyclodextrin, as a shell, so as to decrease the contact of the curing agent with the epoxy resin that contains the curing agent.

Combining a latent curing agent whose curing agent is activated at 70 to 125° C. with a specific curing agent makes possible rapid curing at low temperatures. For example, a curing agent system prepared by combining a latent curing agent, such as "AMICURE" PN-23, with an organic acid dihydrazide, such as valine dihydrazide, or a curing agent system prepared by combining a latent curing agent with a curing accelerator, such as DCMU, makes possible curing at 110° C. for about 10 minutes, thereby preferably used.

Also used are curing compounds described in JP Patent Publication (Kokai) No. 3-177418A (1991), which are prepared by allowing an amine compound, an epoxy resin and urea to react under heating; curing compounds described in JP Patent Publication (Kokai) No. 3-296525A (1991), which are prepared by allowing an N,N-dialkylamino alkyl amine, a cyclic amine including nitrogen atom having active hydrogen and an isocianate, in some cases, along with an epoxide to react under heating; and masterbatch-type curing agents described in JP Patent Publication (Kokai) No. 64-70523A (1989), which are prepared by coating a specific amine compound, as a core, with a reaction product of the specific amine compound and an epoxy resin, as a shell. Any of these compounds may be used individually or in combination.

Desirably, the epoxy resin composition of the present invention is curable at 150° C. within 30 minutes when it is used for applications, such as industrial materials, particularly casings of electrical/electronic equipment, where mass production in a short period time is required. More desirably, the epoxy resin composition of the present invention is curable at 150° C. within 10 minutes. The term "curable" herein used means the characteristic of a resin composition such that when the resin composition undergoes curing operation at a certain temperature for a certain period of time, the resultant cured resin can be released from the mold. More specifically, when 1.5 ml of resin composition is poured in a polytetrafluoroethylene O ring having an inside diameter of 31.7 mm and a thickness of 3.3 mm and placed on a press heated to 150° C. and subjected to curing operation under pressure for 10 minutes, if the resultant cured resin can be released from the O ring without deformation, the resin composition is considered to be curable at 150° C. within 10 minutes.

The epoxy resin composition of the present invention can be blended with a thermoplastic resin so as to control its viscoelasticity or impart toughness to it.

Examples of thermoplastic resins used for this purpose include: poly(methyl methacrylate); poly(vinyl formal); poly (vinyl butyral); poly(vinyl acetal); polyvinylpyrrolidone; polymers containing, as components, at least two kinds of monomers or polymers selected from the group consisting of aromatic vinyl monomer, vinyl cyanide monomer and rubber-like polymer; polyamides; polyesters; polycarbonates; polyarylene oxides; polysulfones; polyethersulfones; and polyimides. Examples of polymers that contain, as components, at least two kinds of monomers or polymers selected from the group consisting of aromatic vinyl monomer, vinyl cyanide monomer and rubber-like polymer include: acrylonitrile-styrene-polybutadiene copolymer (ABS resin) and acrylonitrile-styrene copolymer (AS resin). Polysulfones and polyimides may include those containing an ether bond or amide bond in their backbone.

Poly(methyl methacrylate), poly(vinyl formal), poly(vinyl butyral) and polyvinylpyrrolidone are preferable because they have good compatibility with many kinds of epoxy resins, such as bisphenol A epoxy resin and novolak epoxy resin, and their effect of controlling flowability of thermosetting resin compositions is large. Poly(vinyl formal) is particularly preferable. These thermoplastic resins are commercially available under the name of, for example, "Denka Butyral" and "Denka Formal" (registered trademark, manufactured by DENKI KAGAKU KOGYO KABUSHIKI KAISYA), and "Vinylec" (registered trademark, manufactured by Chisso Corporation).

Polysulfones, polyethersulfones and polyimides whose resin has excellence in heat resistance are preferable not only because they in themselves have excellent heat resistance, but because some of the polymers have a resin skeleton having a suitable compatibility with glycidyl amine epoxy resins, such as tetraglycidyl diamine diphenyl methane, triglycidyl aminophenol, triglycidyl aminocresol and tetraglycidyl xylene diamine, which are epoxy resins often used for applications where heat resistance is required, such as structural members of aircrafts, and the use of such polymers produces a large effect of controlling the flowability of the resin composition and has the effect of increasing the impact resistance of fiber-reinforced resin composite materials. Of such polymers, polysulfones are commercially available under the name of, for example, "RADEL" (registered trademark, manufactured by Solvay Advanced Polymers K.K.) A or "Sumika Excel" (registered trademark) PES (manufactured by Sumitomo Chemical Co., Ltd.), and polyimides are commercially available under the name of, for example, "Ultem" (registered trademark, manufactured by GE Plastics) or "Matrimid" (registered trademark) 5218 (manufactured by Vantico).

In the epoxy resin composition of the present invention, the amount of thermoplastic resin is preferably 1 to 60 parts by weight per 100 parts of epoxy resin. If the amount is smaller than 1 part by weight, expected effects may not sometimes be produced, while if the amount is larger than 60 parts by weight, the draping properties of a prepreg may sometimes deteriorate or the water absorption properties may sometimes be affected.

The epoxy resin composition of the present invention may contain a compound other than the above described ones. For example, to improve the flame retardance, it may contain a metal oxide or a metal hydroxide. However, the content of such a compound in the epoxy resin composition is preferably 10% by weight or lower, more preferably 5% by weight or lower and much more preferably 0% by weight. The amount exceeding 10% by weight may sometimes be unsuitable from the viewpoint of providing a lighter-weight fiber-reinforced composite material.

Preferably, the cured resin obtained by curing the resin composition of the present invention has a specific gravity of 1.35 or lower. Allowing the cured resin to have a specific gravity in such a range makes it possible to provide a lighter-weight fiber-reinforced composite material. The specific gravity of the epoxy resin composition is more preferably 1.33 or lower and much more preferably 1.32 or lower.

If the epoxy resin composition described so far is combined with reinforcing fiber, a fiber-reinforced composite material can be obtained. Processes for producing a fiber-reinforced composite material include: for example, a process in which prepreg in sheet form is prepared by impregnating reinforcing fiber with the epoxy resin composition, and the prepared sheets of a prepreg are laminated and heated, followed by application to the mold; and a process in which no a prepreg is used, and reinforcing fiber is impregnated directly with the epoxy resin composition, followed by heating and curing. Examples of molding methods include: hand lay-up, filament winding, protrusion, resin injection molding and resin transfer molding.

The epoxy resin composition of the present invention is suitably used in the process in which a composite material is obtained through the preparation of a prepreg.

Preferably, the resin composition of the present invention has a viscosity in the range of 10 to 700 Pa·s at 60° C. If the viscosity is lower than 10 Pa·s and the resin having such a viscosity is impregnated into reinforcing fiber to prepare a prepreg, the resin tends to sink in the reinforcing fiber, and only a small amount of the resin stays on the surface of a prepreg. Thus, the surface of a prepreg may sometimes have insufficient tackiness, that is, adhesiveness or the flow of the resin may sometimes become high during molding, causing the irregularities of reinforcing fiber. If the viscosity is higher than 700 Pa·s, such a resin is hard to impregnate into reinforcing fiber or may sometimes adversely affect the moldability of a prepreg or the quality of the resulting molding. The viscosity can be obtained by the measurement made at 60° C. using rotational viscometer Preferably, the epoxy resin composition of the present invention is used in combination with carbon fiber, which has excellent specific modulus and specific strength, particularly in applications where lighter-weight and higher-strength materials are required. As reinforcing fiber, fiber other than carbon fiber, such as glass fiber, aramid fiber, boron fiber, PBO fiber, high strength polyethylene fiber, alumina fiber or silicon carbide fiber, may also be used. Any two or more of these kinds of fiber may be used in mixture form:

When both strength and high stiffness are required, for example, in applications such as structural materials for aircrafts, carbon fiber having a higher modulus of elasticity, a modules of elasticity of 300 GPa or more, is preferably used. When greater importance is attached to thinner wall and lighter weight, for example, in applications such as casings of electrical/electronic equipment, high stiffness is required, and carbon fiber having a tensile strength of 300 GPa or more, or 400 GPa or more may sometimes be used. The term "tensile strength or modulus of elasticity of carbon fiber" herein used means the strand tensile strength or strand modulus in tensile measured in accordance with JIS R7601.

The reinforcing fiber may take any form or alignment. For example, fiber structures such as long fiber aligned in one direction, a single tow, woven fabric, knit, non-woven fabric, mat and braid are used.

A unidirectional a prepreg is particularly preferable because its reinforcing fiber is aligned and has a little bend, and thus, the utility of the strength across the fiber is high. It is preferable to produce a carbon-fiber-reinforced composite material by laminating a plurality of unidirectional a prepreg sheets to give an appropriate laminated structure and applying the laminated structure to the mold, because doing so makes it possible to control the modulus of elasticity and strength of the carbon-fiber-reinforced composite material in any direction.

A woven a prepreg is also preferable because it can provide a material less anisotropic in strength and modulus of elasticity and its use allows the pattern of carbon fiber woven fabric to appear on the surface of the material, thereby adding on design. It is also possible to produce a carbon-fiber-reinforced composite material using more than one kind of a prepreg, for example, using both unidirectional a prepreg and woven a prepreg.

The epoxy resin composition may be impregnated into reinforcing fiber bundles, or, in cases of a prepreg in sheet form, the epoxy resin composition may be localized in the vicinity of a prepreg surface.

The strength and modulus of elasticity of the resultant fiber-reinforced composite material largely depend on the amount of the reinforcing fiber used. In other words, when the amount of reinforcing fiber added is fixed, the smaller the amount of the matrix resin used in combination with the reinforcing fiber, becomes, the more the weight of the final product can be reduced, while allowing the performance of the resultant fiber-reinforced composite material or the final product to be kept constant. For this purpose, the amount of the reinforcing fiber added is preferably 30 to 95% by weight per 100% of fiber-reinforced composite material, more preferably 50 to 90% by weight, and much more preferably 60 to 90% by weight. If the amount of the reinforcing fiber added is smaller than 30% by weight, the weight reducing effect may not be produced, while if the amount is larger than 95% by weight, voids may remain in the composite material, due to too small an amount of the resin, which may cause deterioration of the mechanical properties of the fiber-reinforced composite material or the final product.

A prepreg of the present invention can be prepared by, for example, a wet process in which a resin composition is first dissolved in a solvent, such as methyl ethyl ketone or methanol, so that its viscosity is decreased, followed by impregnation, into reinforcing fiber, or a hot melt process in which a resin composition is heated so that its viscosity is decreased, followed by impregnation into reinforcing fiber.

The wet process is a process in which a prepreg is obtained by the steps of immersing reinforcing fiber in a solution of a resin composition, drawing up the immersed reinforcing fiber from the solution, and evaporating the solvent from the reinforcing fiber in an oven etc.

The hot melt process is a process in which a prepreg is obtained by the steps of heating a resin composition so that the viscosity of the resin composition is decreased and impregnating the resin composition having a decreased viscosity directly into reinforcing fiber, or by the steps of preparing a resin film by coating releasing paper or the like with a resin composition, superimposing the resin film on both sides or one side of reinforcing fiber, and impregnating the resin into the reinforcing fiber by applying heat and pressure. The hot melt process is preferable, because no solvent substantially remains in the resultant a prepreg.

When a prepreg is obtained by the hot melt process, the temperature of the resin composition during its coating operation to obtain a resin film is preferably 30 to 80° C. and more preferably 40 to 70° C. If the temperature is lower than 30° C., the viscosity of the resin composition may be increased, causing the density of the resin composition on the film to be unstable, while if the temperature is higher than 80° C., the curing of the resin may progress during the coating operation, causing the viscosity of the resin composition to be increased.

A fiber-reinforced composite material can also be produced using a prepreg of the present invention by curing the resin into a prepreg under heating while applying heat or pressure to a prepreg.

Molding methods carried out while applying heat or pressure to a prepreg include: pressing, autoclave molding, bag molding, lapping tape molding, and internal pressure molding.

The temperature for molding a prepreg into a fiber-reinforced composite material varies depending on the kind of the curing agent contained in the epoxy resin composition; however, it is preferably 80 to 220° C. If the temperature is lower than 80° C., a sufficient rapid-cure effect may not be obtained, while if the temperature is higher than 220° C., warp is likely to occur in the resultant fiber-reinforced composite material, due to thermal strain. To reduce molding cycle time, pressing is preferably used. To carry out molding at low temperatures, bag molding under vacuum is preferably used.

In the carbon-fiber-reinforced composite material of the present invention, when the content, on a volume basis, of carbon fiber in the entire volume of the carbon-fiber-reinforced composite material (hereinafter represented by Vf) is 60%, the specific gravity of the carbon-fiber-reinforced composite material is desirably 1.7 or lower. If the specific gravity is 1.7 or higher, when the composite material is used for casings of electronic equipment, one of the characteristics of the composite material, "light and strong", may not be fully made use of, and the merit, "light", cannot be obtained satisfactorily.

When Vf is higher than 60%, the specific gravity of the carbon-fiber-reinforced composite material increases; however, compared with other materials having the same thickness and a Vf of 60% or lower, the strength of the resultant carbon-fiber-reinforced composite material increases. Thus, to obtain the same level of strength, the thickness of the composite material is allowed to be decreased. When, for example, Vf is 85%, the specific gravity of the carbon-fiber-reinforced composite material is desirably 1.9 or lower.

On the other hand, when Vf is lower than 60%, the specific gravity of the carbon-fiber-reinforced composite material decreases; however, compared with other materials having the same thickness and a Vf of 60% or higher, the strength of the resultant carbon-fiber-reinforced composite material decreases. Thus, to obtain the same level of strength, the thickness of the composite material needs to be increased. When, for example, Vf is 40%, the specific gravity of the carbon-fiber-reinforced composite material is desirably 1.6 or lower.

When a fiber-reinforced composite material that contains, as a matrix resin, the epoxy resin composition of the present invention is used as casings for electronic equipment, a composite material having a higher Charpy impact strength is preferably used. The reason is that considering the possibility of dropping such equipment, the material having high impact absorption is preferable. When a prepreg used is a unidirectional a prepreg, the Charpy impact strength of the composite material is preferably 100 $J/m^2$ or higher, more preferably 150 $J/m^2$ or higher and much more preferably 200 $J/m^2$ or higher. The Charpy impact strength can be determined by the method in accordance with JIS K7077.

When a fiber-reinforced composite material that contains, as a matrix resin, the epoxy resin composition of the present invention is used as structural materials, the composite material is desired to have a higher tensile strength. When a prepreg used is a unidirectional a prepreg, the tensile strength of the composite material is preferably 1000 MPa or higher, more preferably 1300 MPa or higher and much more preferably 1500 MPa or higher. The tensile strength can be determined by the method in accordance with ASTM D3039.

In the fiber-reinforced composite material obtained by the process described above, the flame retardance obtained by conducting a flammability test for test pieces having a thickness of 2 mm or less in accordance with UL-94 flammability testing is preferably V-1 or higher grade and more preferably V-0. Assuming that such a composite material is used for casings of electrical/electronic equipment designed to have a much thinner wall, the flame retardance obtained for test pieces having a thickness of 1.5 mm or less is preferably V-1 or higher grade and more preferably V-0. Preferably the flame retardance is V-1 or higher grade and more preferably V-0 for test pieces having a thickness of 1.2 mm or less, more preferably for test pieces having a thickness of 0.8 mm or less, and particularly preferably for test pieces having a thickness of 0.5 mm or less.

The "V-1 and V-0" herein used means the flame retardance that meets the requirements of V-1 and V-0 specified, in UL-94 standards (U.S. flammability testing devised by Underwriters Laboratories Inc.), according to burning time or the state of burning, the presence or absence of fire spread, or the presence or absence of drips or the flammability of the drips.

The integrated molding of the present invention includes a fiber-reinforced composite sheet as one of its components.

The fiber-reinforced composite sheet is a sheet-shaped material made up of reinforcing fiber and a matrix resin composition.

Examples of reinforcing fiber used in such a material include: metal fiber such as aluminum, brass or stainless steel fiber; carbon fiber such as acrylonitrile, rayon, lignin or pitch carbon fiber; graphite fiber; insulating fiber such as glass fiber; organic fiber such as aramid, PBO, polyphenylene sulfide, polyester, acryl, nylon or polyethylene fiber; and inorganic fiber such as silicon carbide or silicon nitride. Any of the above kinds of reinforcing fiber having undergone surface treatment may also be used. Kinds of surface treatment include: cladding with metal as an electric conductor; treatment with coupling agent; treatment with sizing agent; and deposition of additives. Any of these kinds of reinforcing fiber may be used alone or in combination.

Of these kinds of reinforcing fiber, carbon fiber is preferably used, from the viewpoint of a balance of specific strength, specific stiffness, light weight and conductivity. And considering production at low cost, polyacrylonitrile carbon fiber is particularly preferably used.

Preferably the reinforcing fiber has the form of a laminate in which layers of fiber having an average length of 10 mm or more are laminated and arranged because such a form allows reinforcing effect of reinforcing fiber to take place effectively. As a form of reinforcing fiber layer, a cloth or a form in which filaments, braids, filament bundles or spun yarn is aligned in one direction can be suitably used. From the viewpoint of reducing the anisotropy of the laminate with respect to strength, preferably layers in which filaments, braids, filament bundles or spun yarn is aligned in one direction are laminated so that they are shifted to different directions. Any of these layer forms may be used alone or in combination.

The strength and modulus of elasticity of the resultant fiber-reinforced composite material largely depend on the amount of the reinforcing fiber used. In other words, when the amount of reinforcing fiber added is fixed, the smaller the amount of the matrix resin used in combination with the reinforcing fiber becomes, the more the weight of the final product can be reduced, while allowing the performance of the resultant fiber-reinforced composite material or the final product to be kept constant. For this purpose, the amount of the reinforcing fiber added is preferably 30 to 95% by weight per 100% of fiber-reinforced composite material, more preferably 50 to 90% by weight, and much more preferably 60 to 90% by weight. If the amount of the reinforcing fiber added is smaller than 30% by weight, the weight reducing effect may not be produced, while if the amount is larger than 95% by weight, voids may remain in the composite material, due to too small an amount of the resin, which may cause deterioration of the mechanical properties of the fiber-reinforced composite material or the final product.

Preferably, the matrix resin composition includes: at least a thermosetting resin composition layer that contains thermosetting resin as a major component; and a thermoplastic resin composition layer that contains thermoplastic resin as a major component.

Use of thermosetting resin is preferable from the viewpoint of mechanical properties of the resultant molding and moldability.

Examples of thermosetting resins that constitute the fiber-reinforced composite sheet of the present invention include: unsaturated polyester, vinyl ester, epoxy, phenol (resol type), urea-melamine, polyimide, bismaleimide, cyanate ester, copolymers thereof, modified forms thereof, and blends of at least two of the above. To enhance the impact resistance of the resultant composite sheet, elastomer or rubber component may be added to the thermosetting resin. Epoxy resin is a particularly preferable thermosetting resin from the viewpoint of mechanical properties of the resultant moldings. To allow superior mechanical properties to be developed, it is preferable that epoxy resin is contained as a major component. Specifically, it is preferable that epoxy resin is contained in an amount of 60% by weight or more.

From the viewpoint of enhancing the flame retardance, it is preferable that the glass transition temperature of the thermosetting resin used satisfies the following equation: $Tmax-Tg \leqq 50$. "Tmax" herein used represents the glass transition temperature of the thermosetting resin that constitutes the fiber-reinforced composite sheet having undergone after-cure and being in such a state that the residual exotherm of the thermosetting resin is not observed by DSC evaluation. Preferably, the glass transition temperature Tg of the thermosetting resin that constitutes the fiber-reinforced composite sheet is evaluated before after-cure, and after-cure is performed in the temperature range of the glass transition temperature $Tg+30$. Performing after-cure in such a temperature range prevents the deterioration and thermal decomposition of the thermosetting resin, whereby the Tmax evaluation can be properly carried out.

If the glass transition temperature of the thermosetting resin used satisfies the following equation: $Tmax-Tg \leqq 50$, the amount of the low-molecular-weight molecules in the thermosetting resin is decreased and the generation of the decomposition gas is suppressed, whereby the flame retardance can be enhanced.

Using the thermoplastic resin composition layer to integrate the fiber-reinforced composite sheet with another member provides firmer joining of the two than using any known adhesive.

Examples of thermoplastic resins used as a major component of the thermoplastic resin composition layer include: polyesters such as polyethylene terephthalate (PET), polybutylene terephthalate (PBT), polytrimethylene terephthalate (PTT), polyethylene naphthalate (PENP) and liquid crystal polyester; polyolefins such as polyethylene (PE), polypropylene (PP) and polybutylene; styrene resin; polyoxymethylene (POM); polyamide (PA); polycarbonate (PC); polymethylene methacrylate (PMMA); polyvinyl chloride (PVC); polyphenylene sulfide (PPS); polyphenylene ether (PPE); modified PPE; polyimide (PI); polyamide-imide (PAI); polyether imide (PEI); polysulfone (PSU); modified PSU; polyethersulfone (PES); polyketone (PK); polyetherketone (PEK); polyetheretherketone (PEEK); polyetherketoneketone (PEKK); polyarylate (PAR); polyethernitrile (PEN); phenol resin; phenoxy resin; fluorine resin such as polytetrafluoroethylene; copolymers thereof; modified forms thereof; and blends of any two or more of the above. Of these thermoplastic resins, polyamide resin is preferably used because of its superior mechanical properties.

To enhance the impact resistance of the resultant composite sheet, elastomer or rubber component may be added to the thermoplastic resin. Other fillers or additives may also be added depending on the application, as long as their addition does not interfere with the object of the present invention. Additives or fillers that can be added to the thermoplastic resin include: for example, inorganic fillers, flame-retardants, conductivity imparting agents, nucleating agents, ultraviolet absorbers, antioxidants, vibration dampers, anti-fungus agents, mothproofing agents, deodorants, anti-colorants, thermal stabilizers, releasing agents, antistatic agents, plasticizers, lubricants, colorants, pigments, dyes, foaming agents, anti-foaming agents and coupling agents.

A flame-retardant can be selected from the same viewpoint as that for the described above flame-retardant (C).

Preferably the solubility parameter δ (SP value) of the thermoplastic resin that constitutes the thermoplastic resin composition layer is 9 to 16, more preferably 10 to 15, and much more preferably 11 to 14. The solubility parameter δ (SP value) indicates the numerical value of the repeating units of polymer at 25° C. which is determined by Fedors' method. The method is described in R. F. Fedors, Polym. Eng. Sci., 14(2), 147 (1974). Selecting the solubility parameter δ (SP value) in the above range allows the cohesive force among the molecular chains of thermoplastic resin to be large, makes the thermoplastic resin composition itself less likely to break, and increases the affinity of the resin for reinforcing fiber, thereby allowing firm bonding force to take place.

Example of thermoplastic resins that can achieve such a solubility parameter δ include: those containing a highly polar bond, functional group or structure such as amide bond, ester bond, urethane bond, ether bond, amino group, hydroxyl group, carboxyl group or aromatic ring. Examples of thermoplastic resin compositions that contain amide bond, ester bond, urethane bond, hydroxyl group or the like include: for example, polyamide resins, polyester resins, polycarbonate resins, ethylene-vinyl alcohol copolymer resins. Examples of thermoplastic resin compositions that contain aromatic ring include: styrene resins and PPS resins. Any of the resins described above may be used individually or in the form of a copolymer thereof, modified form thereof or blend of at least any two kinds of the above.

From the viewpoint of enhancing the mechanical properties of the resultant moldings, it is preferable that the weight fraction of the thermosetting resin composition layer is larger than that of the thermoplastic resin composition layer.

To enhance the impact resistance of the resultant composite sheet, elastomer or rubber component may be added to the matrix resin composition. Other fillers or additives may also be added depending on the application, as long as their addition does not interfere with the object of the present invention. Additives or fillers that can be added to the matrix resin composition include: for example, inorganic fillers, conductivity imparting agents, nucleating agents, ultraviolet absorbers, antioxidants, vibration dampers, anti-fungus agents, mothproofing agents, deodorants, anti-colorants, thermal stabilizers, releasing agents, antistatic agents, plasticizers, lubricants, colorants, pigments, dyes, foaming agents, anti-foaming agents and coupling agents.

As described later, it is preferable that at least part of the reinforcing fiber groups are embedded in the thermosetting resin, while at least part of the other reinforcing fiber groups are embedded in the layer containing thermoplastic resin as a major component. This form ensures firm joining of the fiber-reinforced composite sheet with another member.

The maximum thickness Tpf of the unevenness in the area where there exist reinforcing fiber groups embedded in the layer that contains thermoplastic resin as a major component is preferably 10 to 100 μm, more preferably 20 to 80 μm, and much more preferably 40 to 60 μm. Selecting Tpf in such a range ensures firmer joining of the fiber-reinforced composite sheet with another member. The maximum thickness Tpf is defined as the distance, across the thickness of the layer that contains thermoplastic resin as a major component, between the outermost reinforcing fiber (1-out in FIG. 1) of the reinforcing fiber groups embedded in the layer and the innermost reinforcing fiber (1-in in FIG. 1) of the reinforcing fiber groups embedded in or in contact with the layer that contains thermoplastic resin as a major component. In the above definition, the terms "outermost" and "innermost" are used relative to the surface (4 in FIG. 1) of the layer that contains thermoplastic resin as major component (3 in FIG. 1). If Tpf is a maximum of 100 μm, sufficiently firm joining can be obtained. In the layer that contains thermoplastic resin as a major component, the distance Tsur from the surface 4 to the reinforcing fiber 1-out is preferably 10 to 200 μm and more preferably 20 to 100 μm. Selecting such a range allows the layer that contains thermoplastic resin as a major component to effectively function as a bonding layer. If Tsur is too small, the bonding force becomes poor, while if Tsur is too large, the layer that contains thermoplastic resin as a major component may easily break.

Preferably, the layer that contains thermosetting resin as a major component and the layer that contains thermoplastic resin as a major component form an uneven interface. Forming such an uneven interface increases the contact area of the two layers and allows the two layers to be joined firmly, and as a result, the joining of the fiber-reinforced composite sheet and another member via the layer that contains thermoplastic resin as a major component is also allowed to be firm. Further, in such an interface, the same fiber is embedded both in the layer that contains thermosetting resin as a major component and in the layer that contains thermoplastic resin as a major component, and thus, the bonded surface is reinforced by so-called skewered effect, which ensures firm joining.

The geometry and Tpf of the interface of the layer that contains thermosetting resin as a major component and the layer that contains thermoplastic resin as a major component can be observed by a scanning electron microscope (SEM) or transmission electron microscope (TEM). The test pieces for the observation are prepared by cutting out surface part of the fiber-reinforced composite sheet to thin-wall pieces. The test pieces may be stained so that the contrast between the two layers: one containing thermosetting resin as a major component and the other containing thermoplastic resin as a major component can be controlled.

The flame-retardant (c) contained in the fiber-reinforced composite sheet may be selected from the group consisting of: phosphorus flame-retardants such as triphenyl phosphate, tricresyl phosphate, cresyl diphenyl phosphate, trioctyl phosphate, ammonium polyphosphate, polyphosphazene, phosphate, phosphonate, phosphinate, phosphine oxide condensed phosphate ester, phosphaphenantrene and red phosphorus; inorganic flame-retardants such as calcium aluminate and zirconium oxide; nitrogen flame-retardants such as melamine cyanurate and melamine polyphosphate; silicon flame-retardants; metal hydroxide flame-retardants such as aluminum hydroxide, magnesium hydroxide, calcium hydroxide and tin hydroxide; and phenol flame-retardants.

Preferably, the flame-retardant (c) is a non-halogen flame-retardant, because incineration of fiber-reinforced composite materials containing a halogen flame-retardant at insufficiently high temperatures may emit dioxins. From the viewpoint of light weight, phosphorus, nitrogen and silicon flame-retardants are preferable. More preferable are phosphorus flame-retardants, which have a high flame-retardant effect. The concentration of the phosphorus flame-retardant in the fiber-reinforced composite sheet is preferably 0.2 to 15% by weight in terms of phosphorus atom concentration, because the flame-retardant effect fully takes place at such a concentration. Of the phosphorus flame-retardants, red phosphorus is particularly preferable, because even a small amount of red phosphorus works effectively as a flame-retardant.

Red phosphorus highly stabilized by coating its surface with a metal hydroxide and/or resin is more preferably used. Examples of metal hydroxides used for coating include: aluminum hydroxide, magnesium hydroxide, zinc hydroxide and titanium hydroxide. Neither kind nor amount of the resin coated is limited to specific one. However, as the resin, one having a high affinity for the epoxy resin as the base resin, such as phenolic resin, epoxy resin or polymethylmethacrylate, is preferably used. The amount of the resin coating is preferably 1% by weight or more per 100% of red phosphorus. If the amount is less than 1% by weight, satisfactory coating effect cannot be produced, whereby phosphine gas might be generated during kneading at high temperatures. From the viewpoint of stability, the larger the amount of the coating, the better; however, from the viewpoint of flame-retardant effect and of decrease in weight of fiber-reinforced composite material, preferably the amount of coating is not more than 20% by weight.

When a powdered phosphorus compound is used, preferably one having an average particle size in the range of 0.1 to 70 μm is used. Use of a compound having an average particle size in such a range makes it possible not only to enhance the compound's dispersibility in the epoxy resin and decrease variations in moldability, flame retardance, etc., but to develop effective flame retardance even when only a small amount of the compound is used. A powdered phosphorus compound having an average particle size in the range of 0.5 to 50 μm is more preferably used. The term "average particle size" herein used means the volume average particle size, which can be measured using laser diffraction particle size analyzer.

The content of the flame-retardant in the fiber-reinforced composite sheet is preferably, from the viewpoint of obtaining both mechanical properties and flame retardance, 1 to 20% by weight and more preferably 3 to 12% by weight.

Preferably, the form of the fiber-reinforced composite sheet is that of sandwich having a core material in its inside. Providing such a form enhances the light weight of the composite sheet. From the viewpoint of flame retardance and light weight, as a core material, phenol, polyimide or PPS foamed material is preferable.

In the fiber-reinforced composite sheet of the present invention, it is important that the flame retardance is UL-94 V-1 or V-0 for test pieces having the substantial thickness of the composite sheet and preferably V-0. "For test pieces having the substantial thickness of the composite sheet" herein means that the thickness of the fiber-reinforced composite sheet used is the thickness of the test pieces. If the flame retardance is V-1 or V-0, the composite sheet can be used for products for which flame retardance is required. The substantial thickness is preferably 0.05 to 2.0 mm, and from the viewpoint of thin wall and light weight, it is preferably 0.1 to 1.0 mm and more preferably 0.2 to 0.8 mm.

From the viewpoint of light weight, it is preferable that the fiber-reinforced composite sheet has a density of 1.8 g/cm$^3$ or lower, more preferably. 1.7 g/cm$^3$ or lower, and much more preferably 1.6 g/cm$^3$ or lower. From the viewpoint of strength, the realistic lower limit of the density is 0.05 g/cm$^3$.

Preferably, the fiber-reinforced composite sheet has a modulus of flexure of 35 GPa or higher and more preferably 40 GPa or higher. The fiber-reinforced composite sheet having a modulus of flexure of 35 GPa or higher can be used for practical applications, such as members of electrical/electronic equipment. The modulus of flexure of the fiber-reinforced composite sheet has no upper limit: however, modulus of flexure of about 350 GPa is sufficient in many cases. The details of the measuring method will be described later in Examples.

In the fiber-reinforced composite sheet of the present invention which constitutes the members of electric/electronic equipment, it is important that the flame retardance is UL-94 V-1 or V-0 for test pieces having a thickness of 1.6 mm or smaller and preferably V-0. "For test pieces having a thickness of 1.6 mm or smaller" herein means that if the thickness of the object of measurement is larger than 1.6 mm, the piece is shaven, across the thickness, from both its sides equally to 1.6 mm thick, and the 1.6-mm-thick middle portion left is used as a sample. If the thickness of the object of measurement is equal to or smaller than 1.6 mm, the piece is used as a sample as it is. If the flame retardance is V-2, the composite sheet may fail to conform to the flame retardance requirements of products.

The electromagnetic wave shielding capacity of the fiber-reinforced composite sheet measured by ADVANTEST method is preferably 40 dB or larger at a frequency of 1 GHz, more preferably 45 dB or larger, and much more preferably 50 dB or larger. The details of the measuring method will be described later in Examples.

The integrated molding of the present invention is produced by joining the above described fiber-reinforced composite sheet with another member.

The "another member (II)" may be a member made of a metal material; such as aluminum, iron, magnesium, titanium or an alloy thereof, or of the above described fiber-reinforced composite material, or of a thermoplastic resin composition.

A thermoplastic resin composition having been reinforced by reinforcing fiber is preferably used for "another member (II)", because its use provides a light-weight integrated molding which cannot be realized by any one of metal materials.

Examples of thermoplastic resin that can be used for "another member (II)" include: polyesters such as polyethylene terephthalate (PET), polybutylene terephthalate (PBT), polytrimethylene terephthalate (PTT), polyethylene naphthalate (PENP) and liquid crystal polyester; polyolefins such as polyethylene (PE), polypropylene (PP) and polybutylene; styrene resin; polyoxymethylene (POM); polyamide (PA); polycarbonate (PC); polymethylene methacrylate (PMMA); polyvinyl chloride (PVC); polyphenylene sulfide (PPS); polyphenylene ether (PPE); modified PPE; polyimide (PI); polyamide-imide (PAI); polyetherimide (PEI); polysulfone (PSU); modified PSU; polyethersulfone (PES); polyketone (PK); polyetherketone (PEK); polyetheretherketone (PEEK); polyetherketoneketone (PEKK); polyarylate (PAR); polyethernitrile (PEN); phenol resin; phenoxy resin; fluorine resin such as polytetrafluoroethylene; copolymers thereof; modified forms thereof; and blends of any two or more of the above.

To enhance the impact resistance of the resultant member, elastomer or rubber component may be added to the thermoplastic resin. Other fillers or additives may also be added depending on the application, as long as their addition does not interfere with the object of the present invention. Additives or fillers that can be added to the thermoplastic resin include: for example, inorganic fillers, flame-retardants, conductivity imparting agents, nucleating agents, ultraviolet absorbers, antioxidants, vibration dampers, anti-fungus agents, mothproofing agents, deodorants, anti-colorants, thermal stabilizers, releasing agents, antistatic agents, plasticizers lubricants, colorants, pigments, dyes, foaming agents, anti-foaming agents and coupling agents.

To enhance flame retardance, preferably flame-retardant is added to the thermoplastic resin composition for the "another member (II)". Examples of flame-retardants added to such a thermoplastic resin composition include: phosphorus flame-retardants such as triphenyl phosphate, tricresyl phosphate, cresyl diphenyl phosphate, trioctyl phosphate, ammonium polyphosphate, polyphosphazene, phosphate, phosphonate, phosphinate, phosphine oxide and red phosphorus; inorganic flame-retardants such as calcium aluminate and zirconium oxide; nitrogen flame-retardants such as melamine cyanurate and melamine polyphosphate; silicon flame-retardants; metal hydroxide flame-retardants such as aluminum hydroxide, magnesium hydroxide, calcium hydroxide and tin hydroxide; and phenol flame-retardants.

For the "another member (II)", to further enhance the flame retardance, the fiber-reinforced composite sheet can sometimes be coated with a flame-retardant film, or to further enhance the adhesion to other members, the fiber-reinforced composite sheet can sometimes be coated with an adhesive film. In forming the "another member (II)" into an integrated molding, if the integrated molding is used in a place where its flame retardance is not directly affected, such as inside the product, the second member may be flame-retardant or not flame-retardant. However, flame-retardant one is preferable. When the "another member (II)" is flame-retardant, preferably the flame retardance is UL-94 V-1 or V-0 for test pieces having the substantial thickness of the "another member (II)", more preferably V-1 or V-0 for test pieces having a thickness of 0.1 to 2.0 mm, just like flame retardance of the above described fiber-reinforced composite sheet.

From the viewpoint of mechanical properties, flame retardance and a balance of mechanical properties, it is preferable that the thermoplastic resin composition contains 5 to 35% by weight of reinforcing fiber, 45 to 94% by weight of a polyamide resin and 1 to 20% by weight of a flame-retardant.

Preferably, in the integrated molding of the present invention, the fiber-reinforced composite material is joined with the "another member (II)" via the thermoplastic resin composition layer. Excellent integrality can be obtained by joining the two members via the thermoplastic resin composition layer.

The bonding strength in the vertical direction of the joining portion is preferably 6 MPa or more at 25° C. If the bonding strength is 6 MPa or more, the joining of the members in the integrated molding is allowed to be firm. The bonding strength has no upper limit; however, bonding strength of 40 MPa is sufficient for the integrated molding to be used for the applications the present invention aims at.

To allow the fiber-reinforced composite sheet of the present invention to develop an excellent bonding strength, the bonding strength between two fiber-reinforced composite sheets laminated determined in accordance with ISO4587 is preferably 6 MPa or more at 25° C. If the bonding strength obtained as above is 6 MPa or more, the joining of the members in the integrated molding is allowed to be firm. The bonding strength has no upper limit; however, bonding strength of 40 MPa is sufficient for the integrated molding to be used for the applications the present invention aims at.

Means of producing an integrated molding by joining the above described fiber-reinforced composite sheet and "another member (II)" include: a technique in which the "another member (II)" is joined to the fiber-reinforced composite sheet at a process temperature equal to or higher than the melting point of the thermoplastic resin that constitutes the thermoplastic resin composition layer of the fiber-reinforced composite material, followed by cooling. Joining techniques utilizing melting of thermoplastic resin include: for example, thermal welding, vibration welding, ultrasonic welding, laser welding, insert injection molding and outsert injection molding.

When the "another member (II)" is made up of a metal material, preferably the member undergoes primer treatment as pretreatment for joining.

To integrate the fiber-reinforced composite sheet with "another member (II)", it is preferable to use mechanical joining, such as mating, recessing, bolting or thread fastening, in combination.

The integrated molding of the present invention is suitably used for applications where strength, light weight and flame retardance are required. It is suitable for use: as, for example, casings or members of electric/electronic equipment, information equipment, electronic storage media or acoustic equipment, such as various kinds of gears, various kinds of cases, sensors, LED lumps, connecters, sockets, resistors, relay cases, switches, coil bobbins, condensers, optical pick-ups, oscillators, various kinds of terminal strips, transformers, plugs, printed wiring boards, tuners, speakers, microphones, headphones, miniature motors, magnetic head bases, power modules, semiconductors, displays, FDD carriages, chassis, HDDs, MOs, motor brush holders, note-type personal computers, cellular phones, digital still cameras, PDAs or portable MDs. The integrated molding of the present invention is preferable as casings of electric/electronic equipment.

EXAMPLES

The epoxy resin composition, a prepreg and carbon-fiber-reinforced composite material of the present invention will be described by giving examples. The resin composition and the properties of the resultant resin composition, a prepreg and fiber-reinforced composite material in each example are summarized in Table 1 and Table 2.

1. Preparation of Epoxy Resin Composition, a Prepreg and Carbon-fiber-reinforced Composite Material (1) Raw Materials Used <Epoxy Resin>

"Epicoat" 807 (bisphenol F epoxy resin, manufactured by Japan Epoxy Resins Co., Ltd.), "Epicron" 830 (bisphenol F epoxy resin, manufactured by DAINIPPON INK AND CHEMICALS, INCORPORATED), "Epicoat" 825, "Epicoat" 828, "Epicoat" 834, "Epicoat" 1001 and "Epicoat" 1002 (bisphenol A epoxy resins, manufactured by Japan Epoxy Resins Co., Ltd.), "Epicoat" 154 (bisphenol novolak epoxy resin, manufactured by Japan Epoxy Resins Co., Ltd.), "Epicron" 152 (brominated bisphenol A epoxy resin, epoxy equivalent 360, bromine content 47%, manufactured by DAINIPPON INK AND CHEMICALS, INCORPORATED), "Epicoat" 604 (tetrafunctional glycidyl amine epoxy resin, manufactured by Japan Epoxy Resins Co., Ltd.), "Sumi" (registered trademark) epoxy ELM-434 (tetrafunctional glycidyl amine epoxy resin, manufactured by Sumitomo Chemical Co., Ltd.), "AER" (registered trademark) XAC4151 (isocyanate modified epoxy resin, manufactured by Asahi Kasei Corporation), "Sumi" (registered trademark) epoxy ESCN-220F (cresol novolak-epoxy resin, manufactured by Sumitomo Chemical Co., Ltd.), "Adekaresin". (registered trademark) EPU-6 (urethane modified epoxy resin, manufactured by ASAHI DENKA Co., Ltd.)

<Curing Agent>

DICY7 (dicyandiamide, manufactured by Japan Epoxy Resins Co., Ltd.), "AMICURE" PN-23 (manufactured by Ajinomoto-Fine-Techno Co., Inc.), ADH-4S (adipic acid dihydrazide, manufactured by Otsuka Chemical Co., Ltd.), "Sumicure" (registered trademark) S (4,4-diaminodiphenyl sulfone, manufactured by Sumitomo Chemical Co., Ltd.), TD2131 (novolak phenol curing agent, manufactured by DAINIPPON INK AND CHEMICALS, INCORPORATED), "PLYOPHEN" (registered trademark) VH-4150 (bisphenol A novolak resin, manufactured by DAINIPPON INK AND CHEMICALS, INCORPORATED)

<Curing Accelerator>

DCMU-99 (3,4-dichlorophenyl-1,1-dimethylurea, manufactured by HODOGAYA CHEMICAL CO., LTD.), "OMICURE" (registered trademark) 24 1,1'-(4-methyl-m-phenylene)bis(3,3-dimethylurea), manufactured by PTI Japan Co.,), "OMICURE" (registered trademark) 52 (4,4-methylenebisbis(phenyldimethylurea), manufactured by PTI Japan Co.,), 2E4MZ (2-ethyl-4-methylimidazole, manufactured by SHIKOKU CHEMICALS CORPORATION).

<Thermoplastic Resin>

"Vinylec" K (registered trademark) (polyvinyl formal, manufactured by CHISSO CORPORATION), "Sumicaexcel" (registered trademark) PES5003P (polyether sulfone, manufactured by Sumitomo Chemical Co., Ltd.), "Ultem". (registered trademark) 1000 (polyetherimide, manufactured by General Electric Company)

<Coated Red Phosphorus>

"NOVARED" 120 (registered trademark, average particle size: 25 µm, phosphorus content: 85%), "NOVAEXCEL" 140 (registered trademark, average particle size: 28 µm, phosphorus content: 92%), "NOVAEXCEL" F5 (registered trademark, average particle size: 5 µm, phosphorus content: 92%) (manufactured by RINKAGAKU KOGYO CO., LTD.)

The average particle size of coated red phosphorus is determined using laser diffraction particle size analyzer SALD-200A (manufactured by Shimadzu Corporation)

<Phosphate Ester>

CDP (cresyl diphenyl phosphate, phosphorus content: 9.1%, liquid), CR-733S (resorcinol diphosphate, phosphorus content: 10.9%, liquid) (manufactured by DAIHACHI CHEMICAL INDUSTRY CO., LTD.)

<Other Flame-retardants>

Antimony trioxide, aluminum hydroxide, magnesium oxide (manufactured by Sigma-Aldrich Corporation)

<Carbon Fiber>

"TORAYCA" (registered trademark) T700SC-12K-50C (tensile strength: 4900 MPa, modulus in tension: 235 GPa, fiber specific gravity: 1.80)

(3) Preparation of Cured Epoxy Resin Composition

Epoxy resin was subjected to deaeration under reduced pressure, cast into a mold 2 mm thick, followed by heat curing in a hot-air drier having been preheated to the curing temperature shown in Table 1. Thermocouple was inserted into the resin in the mold, and the length of time the resin was kept at the curing temperature was taken as curing time.

(4) Preparation of a Prepreg

The prepared resin composition was coated on releasing paper using a reverse roll coater to form a resin film. The amount of the resin per unit area was 25 g/m$^2$.

The resin film was superimposed on each side of carbon fiber, TORAYCA (registered trademark) T700SC-12K-50C (Toray Industries, Inc., Inc., tensile strength: 4900 MPa, modulus in tension: 230 GPa), which was aligned in one direction in sheet form and heated and pressurized so that the carbon fiber was impregnated with the resin composition to prepare unidirectional a prepreg.

(5) Production of Fiber-reinforced Composite Sheets (Laminates)

A. (0/90/45)s Laminate

Sheets of unidirectional a prepreg were laminated to give a laminate having a structure (0/90/45)s. The laminate was heated and pressurized at 0.6 MPa using heat press to obtain a carbon-fiber-reinforced composite sheet about 0.6 mm thick. The temperature and time employed are shown in Table 1.

B. (0/90)s Laminate

Sheets of unidirectional a prepreg were laminated to give a laminate having a structure (0/90)s. The laminate was heated and pressurized at 0.6 MPa using heat press to obtain a carbon-fiber-reinforced composite material about 0.4 mm thick. The temperature and time employed are shown in Table 1.

C. (0/0) Laminate

Sheets of unidirectional a prepreg were laminated to give a laminate having a structure (0/0). The laminate was heated and pressurized at 0.6 MPa using heat press to obtain a carbon-fiber-reinforced composite material about 0.2 mm thick. The temperature and time employed are shown in Table 1.

D. Unidirectional Laminate

Sheets of unidirectional a prepreg were laminated so that the fiber was aligned in the same direction and heated and pressurized at 0.6 MPa using heat press to produce two unidirectional fiber-reinforced composite sheets (laminates) 1 mm thick and 3 mm thick, respectively. The temperature and time employed are shown in Table 1.

2. Property Evaluation (1) Specific Gravity

The specific gravity of the cured epoxy resin composition and laminates were determined by underwater replacement at 25° C. in accordance with the procedure described in JIS 7112.

(2) Fiber Volume Fraction

Fiber volume fraction was obtained using the specific gravity of laminates, carbon fiber and cured epoxy resin composition. The specific gravity of carbon fiber was 1.80.

(3) Glass Transition Temperature (Tg)

The glass transition temperature (hereinafter referred to as Tg for short) of the (0/90/45)s laminate was determined using Pyris 1 DSC (differential scanning calorimeter manufactured by PerkinElmar Instrument) in accordance with the procedure described in JIS K7121. Temperature increasing rate was 10° C./min, and the mid point of the portion of the DSC curve where a change appeared as a step in the DSC curve was glass transition temperature.

(4) Flame Retardance

Flame retardance was evaluated by vertical flammability testing in accordance with UL-94.

Five test pieces 12.7±0.1 mm wide and 127±1 mm long were cut out from each of the laminates (0/90/45)s, (0/90)s and (0/0) in such a manner that each test piece has its length in a direction at 45° to the fiber orientation direction. The flame of a burner was adjusted to 19 mm long, the middle portion of the bottom edge of each test piece held vertically was exposed to the flame for 10 seconds, the test piece was kept away from the flame, and the length of time the test piece was burning was recorded. Right after the flame out, the test piece was again exposed to the flame of the burner and then removed from the flame to measure the burning time. When there was no flame drip, the length of time from its flame contact until its flame out was 10 seconds or shorter for the first and second burning, and the total burning time after each test piece was brought in contact with flame 10 times was 50 seconds or shorter, the flame retardance of the laminate was ranked V-0. When the burning time was 30 seconds or shorter and the total burning time after each test piece was brought in contact with flame 10 times was 50 seconds or shorter, the flame retardance of the laminate was ranked V-1. When the burning time was the same as that graded V-1, but there was flame drip, the flame retardance of the laminate was ranked V-2. When the burning time was longer than 30 seconds or the test pieces were burnt to their holding portion, the flame retardance of the laminate was rejected.

(5) Tensile Test

Tensile test was conducted in accordance with the procedure described in ASTM D3039.

A glass tab 56 mm long and 1.5 mm thick was attached to each side of the unidirectional laminate 1±0.05 mm thick, and test pieces 12.7-0.1 mm wide and 250±5 mm long were cut out from the laminate. The test was conducted for the test pieces at a pulling rate of 2.0 mm/min to determine the 0° tensile strength. The number of measurements was n=6, and the average was used as the 0° tensile strength.

(6) Charpy Impact Test

Charpy impact test was conducted in accordance with the procedure described in JIS K7077. Test pieces 10±0.2 mm wide and 80±1 mm long were cut out from the unidirectional laminate in such a manner that a 0° C. direction is the length direction. Blows were applied to the middle portion of each test piece while holding the test piece between two supports, and keeping the distance between the two supports 60 mm, the moment of the hammer around the rotating shaft 300 kgf·cm and the angle of the hammer lift at 134.5°. The impact strength was obtained from the angle of the hammer raised after the fracture of the test piece. The tester used was Charpy impact tester manufactured by YONEKURA MFG.

(7) Evaluation of Curability of Resin Composition

A polytetrafluoroethylene O ring 31.7 mm in inside diameter and 3.3 mm in thickness (Viton (registered trademark) O Ring, manufactured by Du Pont) was placed on a press heated to 150° C., 1.5 ml of resin composition was cast into the O ring, and the press was lowered to cure the resin composition under pressure. The press was raised 10 minutes and 30 minutes after it was lowered. The evaluation was made in such a manner that if the cured resin could be taken out from the O ring without deformation when the press was raised, the curability of the resin composition was judged good, and if the cured resin underwent deformation when taken out, the curability was judged bad.

(8) Evaluation of Tackiness

The tackiness of a prepreg was evaluated by the touch. When a prepreg was felt suitably tacky and easy to handle, its tackiness was judged very good. When a prepreg was felt slightly rich or slightly poor in tackiness, but there was no trouble in handling, its tackiness was judged good. And when a prepreg was felt too tacky or poorly tacky, its tackiness was judged bad.

Example 1

The raw materials shown in Table 1 were mixed in kneader through the following procedure to produce an epoxy resin composition in which polyvinyl formal was uniformly dissolved. The figures shown in Table 1 with respect to resin compositions are in parts by weight (hereinafter the same applies).

(a) Polyvinyl formal was uniformly dissolved in epoxy resin by stirring the mixture of epoxy resin raw materials and polyvinyl formal for 1 to 3 hours while heating the same at 150 to 190° C.

(b) The temperature of the resin was decreased to 90 to 110° C., and a phosphorus compound was added to the mixture, followed by stirring for 20 to 40 minutes.

(c) The temperature of the resin was decreased to 55 to 65° C., dicyandiamide and 3-(3,4-dichlorophenyl)-1,1-dimethylurea were added and kneaded at the same temperature for 30 to 40 minutes, and taken out from the kneader to obtain a resin composition.

The viscosity of the resin composition at 60° C. determined in accordance with the above described procedure was 145 Pa·s, and the moldability evaluation of the same showed that the resin composition was curable at 150° C. in 30 minutes.

A cured resin sheet was prepared using the resin composition and its specific gravity was determined in accordance with the above described procedure. The specific gravity of the cured resin sheet was 1.25.

Further, a prepreg was prepared using the resin composition in accordance with the above described procedure. The resultant a prepreg had a suitable tackiness.

A fiber-reinforced composite sheet was produced using a prepreg in accordance with the above described procedure. The properties of the resultant fiber-reinforced composite sheet are shown in Table 1. Satisfactorily, the flame retardance of the laminate was judged V-0 by conducting flammability test for test pieces having a thickness of about 0.6 mm. The glass transition temperature was as sufficiently high as about 140° C. and the specific gravity was 1.57. The mechanical properties, 0° tensile strength and Charpy impact strength, were good.

Examples 2 to 5

Epoxy resin compositions were prepared in the same manner as in Example 1, provided that the amount of a red phosphorus flame-retardant, "NOVARED" 120, added was changed from 3 parts by weight to 6, 10, 15 and 2 parts by weight, respectively. The evaluation of the properties for each resin composition showed that there was little difference in viscosity and specific gravity between each resin composition and the resin composition of Example 1. The curability of each resin composition was almost the same as that of the resin composition of Example 1. The tackiness of a prepreg was suitable, except a prepreg prepared using the resin composition in which 15 parts of the red phosphorus flame-retardant was added. However, in a prepreg prepared using the resin composition having 1.5 parts of red phosphorus flame-retardant added, the tackiness was somewhat poor, but there was no trouble in handling.

Prepreg and a fiber-reinforced composite sheet were prepared using each resin composition in accordance with the above described procedure. The flame retardance of each of the resultant composite sheets of Examples 2 to 4 was judged V-0 by conducting flammability test for test pieces having a thickness of about 0.6 mm. And the flame retardance of the resultant composite sheet of Example 5 was judged V-1. The other properties of the composite sheets were all as good as those of the composite sheet of Example Comparative Example 1

An epoxy resin composition was prepared in the same manner as in Example 1, provided that the amount of a red phosphorus flame-retardant, "NOVARED" 120, added was 30 parts by weight. The evaluation of the resin viscosity and the specific gravity of the cured resin showed that both had increased values, compared with those of the resin and cured resin of Example 1. A prepreg prepared using the resin composition in the same manner as above had a poor tackiness and was hard to handle. A fiber-reinforced composite sheet was prepared using a prepreg and the composite material properties were evaluated. The evaluation showed that the mechanical properties, such as 0° tensile strength and Charpy impact strength, were lowered.

Comparative Examples 2 to 3

Epoxy resin compositions were prepared in the same manner as in Example 1, provided that the amount of a red phosphorus flame-retardant, "NOVARED" 120, added was 0 and 0.2 parts, respectively. And a prepreg and fiber-reinforced composite sheets were also prepared in the same manner as in Example 1. The properties was made for each resin composition, a prepreg and composite sheet. The flame retardance was rejected for the laminates having the respective thicknesses failed in the flammability test.

Examples 6 to 7

Resin compositions, prepregs and fiber-reinforced composite sheets were prepared in the same manner as in Example 1, provided that "OMICURE" was used, instead of DCMU, as a curing accelerator. The evaluation of the properties was made for each resin composition, a prepreg and composite sheet. The resultant resin compositions were curable at 150° C. in 3 minutes, and the mechanical properties of the composite materials were good, like those of Examples 1 to 4. The flame retardance of the resultant composite sheets was judged V-0 for not only the test pieces having a thickness of about 0.6 mm, but the test pieces having a thick ness of about 0.4 mm and about 0.2 mm, respectively.

Comparative Examples 4 to 6

Resin compositions, prepregs and fiber-reinforced composite sheets were prepared in the same manner as in Examples 6 and 7, provided that no phosphorus compound was added. The evaluation of the properties was made in accordance with the above described procedure. The resultant composite sheets failed in the flammability test.

Examples 8 to 9

Resin compositions, prepregs and fiber-reinforced composite sheets were prepared in the same manner as in Examples 6, 7, provided that "NOVAEXCEL" F5 was used, instead of red phosphoris flame-retardant, "NOVARED" 120. The evaluation of the properties was made for each resin composition, a prepreg and composite sheet. The flame retardance of the resultant composite sheets was judged V-0 for not only the test pieces having a thickness of about 0.6 mm, but the test pieces having a thick ness of about 0.4 mm and about 0.2 mm, respectively. The mechanical properties of the composite materials were as good as those of Examples 6, 7.

Examples 10 to 11

Resin compositions, prepregs and fiber-reinforced composite sheets were prepared in the same manner as in Examples 6, 7, provided that "NOVAEXCEL" 140 was used as a red phosphoris flame-retardant. The evaluation of the properties was made for each resin composition, a prepreg and composite sheet in accordance with the above described procedure. The flame retardance of the resultant composite sheets was judged V-0 for not only the test pieces having a thickness of about 0.6 mm, but the test pieces having a thick ness of about 0.4 mm and about 0.2 mm, respectively. The mechanical properties of the composite materials were as good as those of Examples 6, 7.

Example 12

A resin composition, a prepreg and a fiber-reinforced composite sheet were prepared in the same manner as in Example 1, provided that the composition of the epoxy resin was changed as shown in Table 1 and "OMICURE" 24 as a curing accelerator, and 3 parts of a red phosphoris flame-retardant, "NOVAEXCEL" 140, as a phosphorus compound were added. The evaluation of the properties was made for each resin composition, a prepreg and composite sheet in accordance with the above described procedure. The values of 0° tensile strength and Charpy impact strength were increased, compared with those of Example 1. Satisfactorily, the flame retardance of the resultant composite sheet was judged V-0 for not only the test pieces having a thickness of about 0.6 mm, but the test pieces having a thickness of about 0.4 mm and about 0.2 mm, respectively.

TABLE 1

|  |  | Example 1 | Example 2 | Example 3 | Example 4 |
|---|---|---|---|---|---|
| Epoxy resin (Component [A]) | "Epicoat" 807 |  |  |  |  |
|  | "Epicoat" 828 | 20 | 20 | 20 | 20 |
|  | "Epicoat" 834 | 20 | 20 | 20 | 20 |
|  | "Epicoat" 1001 | 25 | 25 | 25 | 25 |
|  | "Epicoat" 1004AF |  |  |  |  |
|  | "Epicoat" 154 | 35 | 35 | 35 | 35 |
|  | "Epicoat" 604 |  |  |  |  |
|  | "AER" XAC4151 |  |  |  |  |
| Amine curing agent (Component [B]) | Dicy7 | 4 | 4 | 4 | 4 |
| Phosphorus compound (Component [C]) | "NOVARED" 120 | 3 | 6 | 10 | 15 |
|  | "NOVAEXCEL" 140 |  |  |  |  |
|  | "NOVAEXCEL" F5 |  |  |  |  |
|  | CDP |  |  |  |  |
|  | CR-733S |  |  |  |  |
| Curing accelerator (Component [D]) | DCMU-99 | 5 | 5 | 5 | 5 |
|  | "OMICURE" 24 |  |  |  |  |
|  | "OMICURE" 52 |  |  |  |  |
| Thermoplastic resin | "Vinylec" K | 5 | 5 | 5 | 5 |
| Bromine flame-retardant | "Epicron" 152 |  |  |  |  |
| Flame-retardant assistant | Antimony trioxide |  |  |  |  |
| Other flame-retardant | Magnesium oxide |  |  |  |  |
| Phosphorus content of resin composition (wt %) |  | 2.2 | 4.3 | 6.9 | 9.9 |
| Viscosity of resin (Pa · s, 60° C.) |  | 145 | 147 | 151 | 153 |
| Tackiness of prepreg (○○: good, ○: no trouble in handling, X: trouble in handling) |  | ○○ | ○○ | ○○ | ○ (slight) |

TABLE 1-continued

|  |  |  |  |  |  |
|---|---|---|---|---|---|
| Resin curing/composite material molding conditions | Curing/molding temperature | 150° C. | 150° C. | 150° C. | 150° C. |
|  | Curing/molding time | 30 min | 30 min | 30 min | 30 min |
| Properties of cured resin sheet | Specific gravity | 1.245 | 1.259 | 1.28 | 1.292 |
|  | Curability Cured at 150° C. in 10 min | X | X | X | X |
|  | Cured at 150° C. in 30 min | ○ | ○ | ○ | ○ |
| Properties of composite material | Tg (° C.) | 140 | 140 | 140 | 139 |
| Laminated structure: (0/45/90)s | Specific gravity | 1.572 | 1.584 | 1.595 | 1.594 |
|  | Fiber volume fraction (%) | 59 | 60 | 60.5 | 59.5 |
|  | Thickness of laminated sheet (mm) | 0.63 | 0.62 | 0.61 | 0.62 |
|  | Flame retardance | V-0 | V-0 | V-0 | V-0 |
| Properties of composite material | Thickness of laminated sheet (mm) | 0.42 | 0.41 | 0.41 | 0.41 |
| Laminated structure: (0/90)s | Flame retardance | rejected | rejected | V-1 | V-1 |
| Properties of composite material | Thickness of laminated sheet (mm) | 0.21 | 0.21 | 0.2 | 0.21 |
| Laminated structure: (0/0) | Flame retardance | rejected | rejected | rejected | rejected |
| Properties of composite material | 0° tensile strength (MPa) | 2580 | 2560 | 2480 | 2420 |
| Laminated structure: unidirectional | Charpy impact strength (kJ/m²) | 274 | 269 | 275 | 266 |

|  |  | Example 5 | Example 6 | Example 7 | Example 8 |
|---|---|---|---|---|---|
| Epoxy resin (Component [A]) | "Epicoat" 807 |  |  |  |  |
|  | "Epicoat" 828 | 20 | 20 | 20 | 20 |
|  | "Epicoat" 834 | 20 | 20 | 20 | 20 |
|  | "Epicoat" 1001 | 25 | 25 | 25 | 25 |
|  | "Epicoat" 1004AF |  |  |  |  |
|  | "Epicoat" 154 | 35 | 35 | 35 | 35 |
|  | "Epicoat" 604 |  |  |  |  |
|  | "AER" XAC4151 |  |  |  |  |
| Amine curing agent (Component [B]) | Dicy7 | 4 | 4 | 4 | 4 |
| Phosphorus compound (Component [C]) | "NOVARED" 120 | 2 | 3 | 6 |  |
|  | "NOVAEXCEL" 140 |  |  |  |  |
|  | "NOVAEXCEL" F5 |  |  |  | 3 |
|  | CDP |  |  |  |  |
|  | CR-733S |  |  |  |  |
| Curing accelerator (Component [D]) | DCMU-99 | 5 |  |  |  |
|  | "OMICURE" 24 |  | 5 | 5 | 5 |
|  | "OMICURE" 52 |  |  |  |  |
| Thermoplastic resin | "Vinylec" K | 5 | 5 | 5 | 5 |
| Bromine flame-retardant | "Epicron" 152 |  |  |  |  |
| Flame-retardant assistant | Antimony trioxide |  |  |  |  |
| Other flame-retardant | Magnesium oxide |  |  |  |  |
| Phosphorus content of resin composition (wt %) |  | 1.5 | 2.2 | 4.3 | 2.4 |
| Viscosity of resin (Pa · s, 60° C.) |  | 142 | 141 | 145 | 142 |
| Tackiness of prepreg (○○: good, ○: no trouble in handling, X: trouble in handling) |  | ○○ | ○○ | ○○ | ○○ |
| Resin curing/composite material molding conditions | Curing/molding temperature | 150° C. | 150° C. | 150° C. | 150° C. |
|  | Curing/molding time | 30 min | 3 min | 3 min | 3 min |
| Properties of cured resin sheet | Specific gravity | 1.228 | 1.24 | 1.254 | 1.241 |
|  | Curability Cured at 150° C. in 10 min | X | ○ | ○ | ○ |
|  | Cured at 150° C. in 30 min | ○ | ○ | ○ | ○ |
| Properties of composite material | Tg (° C.) | 139 | 139 | 138 | 139 |
| Laminated structure: (0/45/90)s | Specific gravity | 1.569 | 1.577 | 1.582 | 1.576 |
|  | Fiber volume fraction (%) | 59.5 | 59.5 | 60 | 60 |
|  | Thickness of laminated sheet (mm) | 0.6 | 0.59 | 0.58 | 0.6 |
|  | Flame retardance | V-1 | V-0 | V-0 | V-0 |
| Properties of composite material | Thickness of laminated sheet (mm) | 0.4 | 0.4 | 0.39 | 0.4 |
| Laminated structure: (0/90)s | Flame retardance | rejected | V-0 | V-0 | V-0 |
| Properties of composite material | Thickness of laminated sheet (mm) | 0.2 | 0.2 | 0.19 | 0.2 |
| Laminated structure: (0/0) | Flame retardance | rejected | V-0 | V-0 | V-0 |
| Properties of composite material | 0° tensile strength (MPa) | 2570 | 2590 | 2570 | 2590 |
| Laminated structure: unidirectional | Charpy impact strength (kJ/m²) | 275 | 280 | 286 | 280 |

(The figures shown relating to resin composition are in parts by weight.)

Example 13

A resin composition, a prepreg and a fiber-reinforced composite sheet were prepared in the same manner as in Example 1, provided that the composition of the epoxy resin was changed as shown in Table 2. The evaluation of the properties was made for each resin composition, a prepreg and composite sheet in accordance with the above described procedure. The values of 0° tensile strength and Charpy impact strength were increased, compared with those of Example 1, but the other properties were as good as those of Example 1.

Example 14

A resin composition, a prepreg and a fiber-reinforced composite sheet were prepared in the same manner as in Example 1, provided that a phosphorus compound, CDP (cresyl diphenyl phosphate), was used, instead of a red phosphoris flame-retardant, "NOVARED" 120, in a blend ratio shown in Table 2. The evaluation of the properties was made for each resin composition, a prepreg and composite sheet in accordance with the above described procedure. The tackiness of a prepreg was slightly too high, but there was no trouble in handling. And the values of Tg and the Charpy impact strength of the composite material were a little decreased. The other properties were as good as those of Example 1. The flame retardance of the resultant composite sheet was judged V-0 for the test pieces having a thickness of about 0.6 mm and V-1 for the test pieces having a thickness of about 0.4 mm.

Example 15

A resin composition, a prepreg and a fiber-reinforced composite sheet were prepared in the same manner as in Example 1, provided that a phosphorus compound, CR-733S (resorcinol phosphate), was used, instead of a red phosphoris flame-retardant, "NOVARED" 120, in a blend ratio shown in Table 2. The evaluation of the properties was made for each resin composition, a prepreg and composite sheet in accordance with the above described procedure. The values of Tg and Charpy impact strength of the composite material were a little decreased. The other properties were as good as those of Example 1. The flame retardance of the resultant composite sheet was judged V-0 for the test pieces having a thickness of about 0.6 mm and V-1 for the test pieces having a thickness of about 0.4 mm.

Example 16

A resin composition, a prepreg and a fiber-reinforced composite sheet were prepared in the same manner as in Example 2, provided that the composition of the epoxy resin was changed as shown in Table 2. The evaluation of the properties was made for each resin composition, a prepreg and composite sheet in accordance with the above described procedure. The viscosity of the resin composition was as high as 850 Pa·s. And the tackiness of a prepreg was a little low, but there was no trouble in handling. The values of Tg and Charpy impact strength of the composite material were a little decreased, compared with those of Example 2, but the flame retardance of the resultant composite sheet was judged V-0 for the test pieces having a thickness of about 0.6 mm and V-1 for the test pieces having a thickness of about 0.4 mm.

Example 17

A resin composition, a prepreg and a fiber-reinforced composite sheet were prepared in the same manner as in Example 1, provided that the composition of the epoxy resin was changed as shown in Table 2 and 6 parts of a red phosphorus flame-retardant, "NOVAEXCEL" 140, was added as a phosphorus compound. The evaluation of the properties was made for each resin composition, a prepreg and composite sheet in accordance with the same procedure in Example 1. The viscosity of the resin composition was as low as 1.6 Pa·s, there was observed a tendency of resin to sink in the resultant a prepreg, and the tackiness of a prepreg was a little low, but still at a handleable level. The values of Tg and Charpy impact strength of the composite material were a little decreased, compared as those of Example 2, but the flame retardance of the resultant composite sheet was judged V-0 for the test pieces having a thickness of about 0.6 mm and V-1 for the test pieces having a thickness of about 0.4 mm.

TABLE 2

| | | Example 9 | Example 10 | Example 11 | Example 12 | Example 13 |
|---|---|---|---|---|---|---|
| Epoxy resin (Component [A]) | "Epicoat" 807 | | | | 35 | |
| | "Epicoat" 828 | 20 | 20 | 20 | 10 | 20 |
| | "Epicoat" 834 | 20 | 20 | 20 | | 20 |
| | "Epicoat" 1001 | 25 | 25 | 25 | 35 | 25 |
| | "Epicoat" 1004AF | | | | 20 | |
| | "Epicoat" 154 | 35 | 35 | 35 | | 35 |
| | "Epicoat" 604 | | | | | |
| | "AER" XAC4151 | | | | | |
| Amine curing agent (Component [B]) | Dicy7 | 4 | 4 | 4 | 4 | 4 |
| Phosphorus compound | "NOVARED" 120 | | | | | 3 |
| (Component [C]) | "NOVAEXCEL" 140 | | 3 | 6 | 3 | |
| | "NOVAEXCEL" F5 | 6 | | | | |
| | CDP | | | | | |
| | CR-733S | | | | | |
| Curing accelerator (Component [D]) | DCMU-99 | | | | | 5 |
| | "OMICURE" 24 | 5 | 5 | 5 | 5 | |
| | "OMICURE" 52 | | | | | |
| Thermoplastic resin | "Vinylec" K | 5 | 5 | 5 | 5 | 5 |
| Bromine flame-retardant | "Epicron" 152 | | | | | |
| Flame-retardant assistant | Antimony trioxide | | | | | |
| Other flame-retardant | Magnesium oxide | | | | | |
| Phosphorus content of resin composition (wt %) | | 4.6 | 2.4 | 4.6 | 2.4 | 2.3 |
| Viscosity of resin (Pa·s, 60° C.) | | 145 | 143 | 149 | 268 | 202 |
| Tackiness of prepreg (◯◯: good, ◯: no trouble in handling, X: trouble in handling) | | ◯◯ | ◯◯ | ◯◯ | ◯ (slight) | ◯◯ |
| Resin curing/composite material molding conditions | Curing/molding temperature | 150° C. | 150° C. | 150° C. | 150° C. | 150° C. |
| | Curing/molding time | 3 min | 3 min | 3 min | 3 min | 30 min |
| Properties of cured resin sheet | Specific gravity | 1.257 | 1.242 | 1.256 | 1.234 | 1.239 |
| | Curability Cured at 150° C. in 10 min | ◯ | ◯ | ◯ | ◯ | X |
| | Cured at 150° C. in 30 min | ◯ | ◯ | ◯ | ◯ | ◯ |
| Properties of composite material Laminated structure: (0/45/90)s | Tg (° C.) | 139 | 140 | 139 | 118 | 131 |
| | Specific gravity | 1.586 | 1.568 | 1.582 | 1.574 | 1.577 |
| | Fiber volume fraction (%) | 60.5 | 58.5 | 60 | 60 | 60.3 |
| | Thickness of laminated sheet (mm) | 0.63 | 0.61 | 0.64 | 0.6 | 0.6 |
| | Flame retardance | V-0 | V-0 | V-0 | V-0 | V-0 |
| Properties of composite material Laminated structure: (0/90)s | Thickness of laminated sheet (mm) | 0.42 | 0.41 | 0.43 | 0.39 | 0.4 |
| | Flame retardance | V-0 | V-0 | V-0 | V-0 | rejected |
| Properties of composite material Laminated structure: (0/0) | Thickness of laminated sheet (mm) | 0.21 | 0.2 | 0.22 | 0.19 | 0.2 |
| | Flame retardance | V-0 | V-0 | V-0 | V-0 | rejected |
| Properties of composite material Laminated structure: unidirectional | 0° tensile strength (MPa) | 2580 | 2590 | 2590 | 2700 | 2690 |
| | Charpy impact strength (kJ/m$^2$) | 274 | 280 | 260 | 430 | 415 |

TABLE 2-continued

|  |  | Example 14 | Example 15 | Example 16 | Example 17 |
|---|---|---|---|---|---|
| Epoxy resin (Component [A]) | "Epicoat" 807 |  |  |  |  |
|  | "Epicoat" 828 | 20 | 20 | 20 | 20 |
|  | "Epicoat" 834 | 20 | 20 | 20 | 20 |
|  | "Epicoat" 1001 | 25 | 25 | 25 | 25 |
|  | "Epicoat" 1004AF |  |  |  |  |
|  | "Epicoat" 154 | 35 | 35 | 35 | 35 |
|  | "Epicoat" 604 |  |  |  |  |
|  | "AER" XAC4151 |  |  |  |  |
| Amine curing agent (Component [B]) | Dicy7 | 4 | 4 | 4 | 4 |
| Phosphorus compound (Component [C]) | "NOVARED" 120 |  |  | 6 |  |
|  | "NOVAEXCEL" 140 |  |  |  | 6 |
|  | "NOVAEXCEL" F5 |  |  |  |  |
|  | CDP | 35 |  |  |  |
|  | CR-733S |  | 25 |  |  |
| Curing accelerator (Component [D]) | DCMU-99 | 5 | 5 | 5 | 5 |
|  | "OMICURE" 24 |  |  |  |  |
|  | "OMICURE" 52 |  |  |  |  |
| Thermoplastic resin | "Vinylec" K | 5 | 5 | 5 |  |
| Bromine flame-retardant | "Epicron" 152 |  |  |  |  |
| Flame-retardant assistant | Antimony trioxide |  |  |  |  |
| Other flame-retardant | Magnesium oxide |  |  |  |  |
| Phosphorus content of resin composition (wt %) |  | 2.2 | 2 | 4.6 | 4.6 |
| Viscosity of resin (Pa · s, 60° C.) |  | 89 | 122 | 850 | 1.6 |
| Tackiness of prepreg (○○: good, ○: no trouble in handling, X: trouble in handling) |  | ○○ | ○○ | ○○ | ○○ |
| Resin curing/composite material molding conditions | Curing/molding temperature | 150° C. | 150° C. | 150° C. | 150° C. |
|  | Curing/molding time | 3 min | 3 min | 3 min | 3 min |
| Properties of cured resin sheet | Specific gravity | 1.215 | 1.23 | 1.259 | 1.256 |
|  | Curability  Cured at 150° C. in 10 min | X | X | X | X |
|  | Cured at 150° C. in 30 min | ○ | ○ | ○ | ○ |
| Properties of composite material | Tg (° C.) | 137 | 139 | 140 | 140 |
| Laminated structure: (0/45/90)s | Specific gravity | 1.565 | 1.569 | 1.584 | 1.582 |
|  | Fiber volume fraction (%) | 59.8 | 59.5 | 60 | 60 |
|  | Thickness of laminated sheet (mm) | 0.6 | 0.6 | 0.63 | 0.63 |
|  | Flame retardance | V-0 | V-0 | V-0 | V-0 |
| Properties of composite material Laminated structure: (0/90)s | Thickness of laminated sheet (mm) | 0.4 | 0.39 | 0.42 | 0.41 |
|  | Flame retardance | V-1 | V-1 | V-1 | V-1 |
| Properties of composite material Laminated structure: (0/0) | Thickness of laminated sheet (mm) | 0.2 | 0.2 | 0.21 | 0.21 |
|  | Flame retardance | rejected | rejected | rejected | rejected |
| Properties of composite material Laminated structure: unidirectional | 0° tensile strength (MPa) | 2480 | 2510 | 2370 | 2310 |
|  | Charpy impact strength (kJ/m$^2$) | 230 | 233 | 225 | 231 |

(The figures shown relating to resin composition are in parts by weight.)

Comparative Example 7

A resin composition, a prepreg and a fiber-reinforced composite sheet were prepared in the same manner as in Example 1, provided that 30 parts of magnesium oxide was added, instead of a red phosphoris flame-retardant, "NOVARED" 120. The evaluation of the properties was made for each resin composition, a prepreg and composite sheet. The tackiness of the resultant a prepreg was insufficient. And unsatisfactorily the flame retardance of the resultant composite sheet was judged V-2 even for the test pieces having a thickness of about 0.6 mm and the test pieces having a thickness other than 0.6 mm failed in the flammability test. And moreover, the specific gravity of the cured resin was as high as 1.43 and that of the composite material was as high as 1.65. The values of 0° tensile strength and Charpy impact strength were decreased, compared with those of Example 1.

Comparative Example 8

A resin composition, a prepreg and a fiber-reinforced composite sheet were prepared in the same manner as in Example 1, provided that antimony trioxide was used instead of a red phosphoris flame-retardant, "NOVARED" 120, and a part of "Epicoat" 1001 was replaced by a brominated epoxy resin, "Epicron" 152. The evaluation of the properties was made for each resin composition, a prepreg and composite sheet in accordance with the above described procedure. The mechanical properties, such as 0° modulus in tension, were almost the same as those of Example 1 and the flame retardance of the resultant composite sheet was judged V-0 for the test pieces having a thickness of about 0.6 mm and V-1 for the test pieces having a thickness of about 0.4 mm. However, the tackiness of a prepreg was too high to handle, though the viscosity of the resin was almost the same as that of Example 14. The specific gravity of the cured resin was as high as 1.37 and that of the composite material was as high as 1.63.

TABLE 3

|  | Comparative | Comparative | Comparative | Comparative |
|---|---|---|---|---|

TABLE 3-continued

|  |  | Example 1 | Example 2 | Example 3 | Example 4 |
|---|---|---|---|---|---|
| Epoxy resin (Component [A]) | "Epicoat" 807 |  |  |  |  |
|  | "Epicoat" 828 | 20 | 20 | 20 | 20 |
|  | "Epicoat" 834 | 20 | 20 | 20 | 20 |
|  | "Epicoat" 1001 | 25 | 25 | 25 | 25 |
|  | "Epicoat" 1004AF |  |  |  |  |
|  | "Epicoat" 154 | 35 | 35 | 35 | 35 |
|  | "Epicoat" 604 |  |  |  |  |
|  | "AER" XAC4151 |  |  |  |  |
| Amine curing agent (Component [B]) | Dicy7 | 4 | 4 | 4 | 4 |
| Phosphorus compound (Component [C]) | "NOVARED" 120 | 30 | 0.2 |  |  |
|  | "NOVAEXCEL" 140 |  |  |  |  |
|  | "NOVAEXCEL" F5 |  |  |  |  |
|  | CDP |  |  |  |  |
|  | CR-733S |  |  |  |  |
| Curing accelerator (Component [D]) | DCMU-99 | 5 | 5 | 5 |  |
|  | "OMICURE" 24 |  |  |  | 5 |
|  | "OMICURE" 52 |  |  |  |  |
| Thermoplastic resin | "Vinylec" K | 5 | 5 | 5 | 5 |
| Bromine flame-retardant | "Epicron" 152 |  |  |  |  |
| Flame-retardant assistant | Antimony trioxide |  |  |  |  |
| Other flame-retardant | Magnesium oxide |  |  |  |  |
| Phosphorus content of resin composition (wt %) |  | 17 | 0.1 | 0 | 0 |
| Viscosity of resin (Pa · s, 60° C.) |  | 350 | 140 | 139 | 135 |
| Tackiness of prepreg (○○: good, ○: no trouble in handling, X: trouble in handling) |  | X (poor) | ○○ | ○○ | ○○ |
| Resin curing/composite material molding conditions | Curing/molding temperature | 150° C. | 150° C. | 150° C. | 150° C. |
|  | Curing/molding time | 30 min | 30 min | 30 min | 3 min |
| Properties of cured resin sheet | Specific gravity | 1.33 | 1.22 | 1.231 | 1.226 |
|  | Curability  Cured at 150° C. in 10 min | X | X | X | ○ |
|  | Cured at 150° C. in 30 min | ○ | ○ | ○ | ○ |
| Properties of composite material | Tg (° C.) | 141 | 140 | 140 | 140 |
| Laminated structure: (0/45/90)s | Specific gravity | 1.61 | 1.571 | 1.57 | 1.57 |
|  | Fiber volume fraction (%) | 59.6 | 60.5 | 59.5 | 60 |
|  | Thickness of laminated sheet (mm) | 0.62 | 0.59 | 0.63 | 0.61 |
|  | Flame retardance | V-0 | rejected | rejected | rejected |
| Properties of composite material | Thickness of laminated sheet (mm) | 0.42 | 0.39 | 0.42 | 0.41 |
| Laminated structure: (0/90)s | Flame retardance | V-1 | rejected | rejected | rejected |
| Properties of composite material | Thickness of laminated sheet (mm) | 0.21 | 0.19 | 0.22 | 0.21 |
| Laminated structure: (0/0) | Flame retardance | V-1 | rejected | rejected | rejected |
| Properties of composite material | 0° tensile strength (MPa) | 1990 | 2590 | 2580 | 2570 |
| Laminated structure: unidirectional | Charpy impact strength (kJ/m$^2$) | 223 | 265 | 260 | 279 |

|  |  | Comparative Example 5 | Comparative Example 6 | Comparative Example 7 | Comparative Example 8 |
|---|---|---|---|---|---|
| Epoxy resin (Component [A]) | "Epicoat" 807 | 35 |  |  |  |
|  | "Epicoat" 828 | 10 | 50 | 20 | 20 |
|  | "Epicoat" 834 |  |  | 20 | 10 |
|  | "Epicoat" 1001 | 35 | 20 | 25 | 5 |
|  | "Epicoat" 1004AF | 20 |  |  |  |
|  | "Epicoat" 154 |  |  | 35 | 35 |
|  | "Epicoat" 604 |  |  |  |  |
|  | "AER" XAC4151 |  | 30 |  |  |
| Amine curing agent (Component [B]) | Dicy7 | 4 | 4 | 4 | 4 |
| Phosphorus compound (Component [C]) | "NOVARED" 120 |  |  |  |  |
|  | "NOVAEXCEL" 140 |  |  |  |  |
|  | "NOVAEXCEL" F5 |  |  |  |  |
|  | CDP |  |  |  |  |
|  | CR-733S |  |  |  |  |
| Curing accelerator (Component [D]) | DCMU-99 |  | 4 | 5 | 5 |
|  | "OMICURE" 24 | 5 |  |  |  |
|  | "OMICURE" 52 |  |  |  |  |
| Thermoplastic resin | "Vinylec" K | 5 | 5 | 5 | 5 |
| Bromine flame-retardant | "Epicron" 152 |  |  |  | 30 |
| Flame-retardant assistant | Antimony trioxide |  |  |  | 10 |
| Other flame-retardant | Magnesium oxide |  |  | 30 |  |
| Phosphorus content of resin composition (wt %) |  | 0 | 0 | 0 | 0 |
| Viscosity of resin (Pa · s, 60° C.) |  | 245 | 190 | 325 | 92 |
| Tackiness of prepreg (○○: good, ○: no trouble in handling, X: trouble in handling) |  | ○○ | ○○ | X (poor) | X (excess) |
| Resin curing/composite material molding conditions | Curing/molding temperature | 150° C. | 150° C. | 150° C. | 150° C. |
|  | Curing/molding time | 3 min | 30 min | 30 min | 30 min |
| Properties of cured resin sheet | Specific gravity | 1.22 | 1.239 | 1.427 | 1.402 |
|  | Curability  Cured at 150° C. in 10 min | ○ | X | X | X |
|  | Cured at 150° C. in 30 min | ○ | ○ | ○ | ○ |
| Properties of composite material | Tg (° C.) | 117 | 131 | 140 | 146 |
| Laminated structure: (0/45/90)s | Specific gravity | 1.569 | 1.576 | 1.652 | 1.643 |
|  | Fiber volume fraction (%) | 60.1 | 60 | 60.2 | 60.5 |
|  | Thickness of laminated sheet (mm) | 0.6 | 0.61 | 0.6 | 0.62 |
|  | Flame retardance | rejected | rejected | V-2 | V-0 |

TABLE 3-continued

| Properties of composite material | Thickness of laminated sheet (mm) | 0.4 | 0.4 | 0.4 | 0.41 |
| --- | --- | --- | --- | --- | --- |
| Laminated structure: (0/90)s | Flame retardance | rejected | rejected | rejected | V-1 |
| Properties of composite material | Thickness of laminated sheet (mm) | 0.2 | 0.21 | 0.2 | 0.21 |
| Laminated structure: (0/0) | Flame retardance | rejected | rejected | rejected | rejected |
| Properties of composite material | 0° tensile strength (MPa) | 2710 | 2700 | 1910 | 2550 |
| Laminated structure: unidirectional | Charpy impact strength (kJ/m$^2$) | 435 | 413 | 220 | 260 |

(The figures shown relating to resin composition are in parts by weight.)

Example 18

A resin composition was prepared in the same manner as in Example 1, provided that the composition of the epoxy resin was changed as shown in Table 4 and the temperature at which a curing agent was added was changed to 55° C. The viscosity of the resultant resin composition at 60° C. was 63 Pa·s. The specific gravity of the cured resin obtained by curing the resin composition at 80° C. for 2 hours was 1.25. Prepreg was prepared using the resin composition in accordance with the above described procedure. The tackiness of the resultant a prepreg was a little high, but there was no problem in handling. Then, a composite sheet was prepared by laminating sheets of a prepreg and molding the laminate at 80° C. for 2 hours. Satisfactorily, the flame retardance of the resultant composite sheet was judged V-0. The glass transition temperature of the same was 83° C., the specific gravity was 1.58. The mechanical properties, such as O tensile strength and Charpy impact strength, were good.

Example 19

A resin composition was prepared in the same manner as in Example 18, provided that the composition of the epoxy resin was changed as shown in Table 4, "Amicure" PN-23 was added and stirred, and adipic acid dihydrazide, as an amine curing agent, was added and stirred for 15 minutes. The cured resin obtained by curing the resultant resin composition at 110° C. for 10 minutes had a specific gravity of 1.25. The tackiness of a prepreg prepared using the resin composition was a little high, but still at a handleable level. A composite material was produced by laminating sheets of a prepreg and molding the laminate at 110° C. for 10 minutes, and the properties of the material were evaluated. The evaluation showed that the properties were almost the same as those of Example 18 except that the Tg was 105° C.

Comparative Examples 9 to 10

A resin composition, a prepreg and a fiber-reinforced composite sheet were prepared in the same manner as in Examples 18 and 19, provided that a red phosphorus flame-retardant, "NOVARED" 120 was not added. Of the properties evaluated, the results were failed for the flame retardance.

Example 20

A resin composition was prepared in the same manner as in Example 1, provided that "Sumicure" S, as an amine curing agent, and "Sumicaexcel" PES5003, as a thermoplastic resin, were used and the composition of the epoxy resin was changed as shown in Table 4. The viscosity of the resultant resin composition at 60° C. was 245 Pa·s. The specific gravity of the cured resin obtained by curing the resin composition at 180° C. for 2 hours was 1.29. Prepreg was prepared using the resin composition in accordance with the above described procedure. The tackiness of the resultant a prepreg was suitable. Then, a composite sheet was prepared by laminating sheets of a prepreg and molding the laminate at 180° C. for 2 hours. Satisfactorily, the flame retardance of the resultant composite sheet was judged V-0. The Tg of the same was 203° C., the specific gravity was 1.59. The mechanical properties, such as 0° tensile strength and Charpy impact strength, were good.

Example 21

A resin composition was prepared in the same manner as in Example 1, provided that "Sumicure" S, as an amine curing agent, and "Ultem" 1000, as a thermoplastic resin, were used and the composition of the epoxy resin was changed as shown in Table 4. The viscosity of the resultant resin composition at 60° C. was 433 Pa·s. The specific gravity of the cured resin obtained by curing the resin composition at 125° C. for 2 hours was 1.25. Prepreg was prepared using the resin composition in accordance with the above described procedure. The tackiness of the resultant a prepreg was suitable. Then, a composite sheet was prepared by laminating sheets of a prepreg and molding the laminate at 125° C. for 2 hours. Satisfactorily, the flame retardance of the resultant composite sheet was judged V-0. The glass transition temperature of the same was 130° C., the specific gravity was 1.58. The mechanical properties, such as 0° tensile strength and Charpy impact strength, were good. Comparative Example 11

A resin composition, a prepreg and a fiber-reinforced composite sheet were prepared in the same manner as in Example 20, provided that a red phosphorus flame-retardant, "NOVARED" 120 was not added. Of the properties evaluated the results were failed for, the flame retardance.

Comparative Example 12

A resin composition was prepared in the same manner as in Example 1, provided that the composition of the epoxy resin was changed as shown in Table 4 and a bisphenol A novolak resin, "PLYOPHEN" VH-4150 was used instead of an amine curing agent, and added simultaneously with red phosphorus. The viscosity of the resultant resin composition at 60° C. was as very high as 1250 Pa·s. Thus, a resin film could not be prepared using this resin composition, and hence a prepreg. The specific gravity of the cured resin sheet was as high as 1.40.

TABLE 4

|  | Example 18 | Example 19 | Example 20 |
| --- | --- | --- | --- |

TABLE 4-continued

| | | | | |
|---|---|---|---|---|
| Epoxy resin (Component [A]) | "Epicoat" 807 | | | |
| | "Epicoat" 825 | | | 20 |
| | "Epicoat" 830 | | | 20 |
| | "Epicoat" 828 | 60 | 100 | |
| | "Epicoat" 834 | | | |
| | "Epicoat" 1001 | | | |
| | "Epicoat" 1002 | | | |
| | "Adekaresin" EPU-6 | | | |
| | "Epicoat" 604 | | | |
| | "Smiepoxy" ELM434 | | | 60 |
| | "Epicoat" 154 | 40 | | |
| | "Smiepoxy" ESCN-220F | | | |
| Amine curing agent (Component [B]) | Dicy7 | | | |
| | "Sumicure" S | | | 46 |
| | "AMICURE" PN-23 | 10 | 10 | |
| | ADH-S | | 23 | |
| Phosphorus compound (Component [C]) | "NOVARED" 120 | 4 | 4 | 4 |
| Curing agent other than component [B] | | | | |
| Curing accelerator (Component [D]) | DCMU-99 | | | |
| Thermoplastic resin | 2E4MZ | | | |
| Other flame-retardant | "Vinylec" K | 10 | 10 | |
| | "Sumicaexcel" PES5003P | | | 17 |
| | "Ultem" 1000 | | | |
| | Aluminum hydroxide | | | |
| Phosphorus content of resin composition (wt %) | | 2.8 | 2.3 | 2 |
| Viscosity of resin (Pa · s, 60° C.) | | 63 | 49 | 245 |
| Tackiness of prepreg (◯◯: good, ◯: no trouble in handling, X: trouble in handling) | | ◯ (high) | ◯ (high) | ◯◯ |
| Resin curing/composite material molding conditions | Curing/molding temperature | 80° C. | 110° C. | 180° C. |
| | Curing/molding time | 2 h | 10 min | 2 h |
| Properties of cured resin sheet | Specific gravity | 1.246 | 1.249 | 1.29 |
| Properties of composite material | Tg (° C.) | 83 | 105 | 203 |
| Laminated structure: (0/45/90)s | Specific gravity | 1.578 | 1.574 | 1.593 |
| | Fiber volume fraction (%) | 60 | 59 | 59.5 |
| | Thickness of laminated sheet (mm) | 0.62 | 0.61 | 0.61 |
| | Flame retardance | V-0 | V-0 | V-0 |
| Properties of composite material | 0° tensile strength (MPa) | 2580 | 2590 | 2600 |
| Laminated structure: unidirectional | Charpy impact strength (kJ/m²) | 265 | 273 | 270 |

| | | Example 21 | Comparative Example 12 |
|---|---|---|---|
| Epoxy resin (Component [A]) | "Epicoat" 807 | | |
| | "Epicoat" 825 | | |
| | "Epicoat" 830 | | |
| | "Epicoat" 828 | | 20 |
| | "Epicoat" 834 | 10 | |
| | "Epicoat" 1001 | | 60 |
| | "Epicoat" 1002 | 40 | |
| | "Adekaresin" EPU-6 | 30 | |
| | "Epicoat" 604 | 20 | |
| | "Smiepoxy" ELM434 | | |
| | "Epicoat" 154 | | |
| | "Smiepoxy" ESCN-220F | | 20 |
| Amine curing agent (Component [B]) | Dicy7 | | |
| | "Sumicure" S | 10 | |
| | "AMICURE" PN-23 | | |
| | ADH-S | | |
| Phosphorus compound (Component [C]) | "NOVARED" 120 | 1.5 | 2 |
| Curing agent other than component [B] | | | 35 |
| Curing accelerator (Component [D]) | DCMU-99 | 3 | |
| Thermoplastic resin | 2E4MZ | | 0.04 |
| Other flame-retardant | "Vinylec" K | | |
| | "Sumicaexcel" PES5003P | | |
| | "Ultem" 1000 | 5 | |
| | Aluminum hydroxide | | 85 |
| Phosphorus content of resin composition (wt %) | | 1.1 | 0.8 |
| Viscosity of resin (Pa · s, 60° C.) | | 433 | 1250 |
| Tackiness of prepreg (◯◯: good, ◯: no trouble in handling, X: trouble in handling) | | ◯◯ | Prepreg could not be prepared. |
| Resin curing/composite material molding conditions | Curing/molding temperature | 125° C. | 170° C. |
| | Curing/molding time | 2 h | 90 min |
| Properties of cured resin sheet | Specific gravity | 1.245 | 1.403 |
| Properties of composite material | Tg (° C.) | 130 | unmeasurable |
| Laminated structure: (0/45/90)s | Specific gravity | 1.579 | unmeasurable |
| | Fiber volume fraction (%) | 60.1 | unmeasurable |
| | Thickness of laminated sheet (mm) | 0.62 | unmeasurable |
| | Flame retardance | V-0 | unmeasurable |
| Properties of composite material | 0° tensile strength (MPa) | 2530 | unmeasurable |
| Laminated structure: unidirectional | Charpy impact strength (kJ/m²) | 380 | unmeasurable |

(The figures shown relating to resin composition are in parts by weight.)

Comparative Example 13

A resin composition, a prepreg and a fiber-reinforced composite sheet were prepared in the same manner as in Example 1, provided that the resin composition was changed as shown in Table 5. The evaluation of the properties was made for the resultant resin composition, a prepreg and fiber-reinforced composite sheet in accordance with the above described procedure. The flame retardance of the composite material was judged V-0, but the specific gravity of the cured resin and the composite material was high and the tackiness of a prepreg was a little insufficient. The mechanical properties, such as tensile strength and Charpy impact strength, were low.

Comparative Example 14

A resin composition was prepared by: melting a novolak phenol curing agent, TD2131, in the epoxy resin, followed by stirring; and cresyl diphenyl phosphate, as a phosphorus compound, and 2E4MZ, as a curing agent, were added and kneaded for 30 minutes at about 60° C. The viscosity of the resultant resin composition at 60° C. was as very high as 1050 Pa·s. Prepreg was prepared using this resin composition. The surface of the resultant a prepreg was dry and rough and completely lacked tackiness, and thus, handling it was troublesome. Then a composite sheet was prepared by laminating sheets of a prepreg and molding the laminate at 180° C. for 3 hours. The properties of the resultant composite sheet are as shown in Table 5. The flame retardance was V-0, the glass transition temperature was 130° C. and the specific gravity was 1.57; however, there existed many voids in the composite material, and the 0° tensile strength and Charpy impact strength were low.

TABLE 5

| | | Comparative Example 9 | Comparative Example 10 | Comparative Example 11 | Comparative Example 13 | Comparative Example 14 |
|---|---|---|---|---|---|---|
| Epoxy resin (Component [A]) | "Epicoat" 807 | | | | | 100 |
| | "Epicoat" 825 | | | 20 | | |
| | "Epicoat" 830 | | | 20 | | |
| | "Epicoat" 828 | 60 | 100 | | | |
| | "Epicoat" 834 | | | | 10 | |
| | "Epicoat" 1001 | | | | | |
| | "Epicoat" 1002 | | | | 40 | |
| | "Adekaresin" EPU-6 | | | | 30 | |
| | "Epicoat" 604 | | | | 20 | |
| | "Smiepoxy" ELM434 | | | 60 | | |
| | "Epicoat" 154 | 40 | | | | |
| Amine curing agent (Component [B]) | Dicy7 | | | 46 | 10 | |
| | "Sumicure" S | 10 | 10 | | | |
| | "AMICURE" PN-23 | | 23 | | | |
| | ADH-S | | | | | |
| Phosphorus compound (Component [C]) | CDP | | | | | 20 |
| Curing agent other than component [B] | TD2131 | | | | | 60 |
| Curing accelerator (Component [D]) | DCMU-99 | | | | 3 | |
| | 2E4MZ | | | | | 0.1 |
| Thermoplastic resin | "Vinylec" K | 10 | 10 | | | |
| | "Sumicaexcel" PES5003P | | | 17 | | |
| | "Ultem" 1000 | | | | 5 | |
| Other flame-retardant | Magnesium oxide | | | | 20 | |
| Phosphorus content of resin composition (wt %) | | 0 | 0 | 0 | 0 | 1 |
| Viscosity of resin (Pa·s, 60° C.) | | 58 | 47 | 238 | 476 | 1090 |
| Tackiness of prepreg (○○: good, ○: no trouble in handling, X: trouble in handling) | | ○ (high) | ○ (high) | ○○ | ○ (slight) | X (slight) |
| Resin curing/composite material molding conditions | Curing/molding temperature | 80° C. | 110° C. | 180° C. | 125° C. | 180° C. |
| | Curing/molding time | 2 h | 10 min | 2 h | 2 h | 3 h |
| Properties of cured resin sheet | Specific gravity | 1.226 | 1.223 | 1.275 | 1.375 | 1.23 |
| Properties of composite material | Tg (° C.) | 82 | 104 | 202 | 132 | 203 |
| Laminated structure: (0/45/90)s | Specific gravity | 1.568 | 1.567 | 1.59 | 1.632 | 1.569 |
| | Fiber volume fraction (%) | 59.5 | 59.7 | 60 | 60.5 | 59.5 |
| | Thickness of laminated sheet (mm) | 0.59 | 0.62 | 0.6 | 0.63 | 0.64 |
| | Flame retardance | rejected | rejected | rejected | V-0 | V-0 |
| Properties of composite material | 0° tensile strength (MPa) | 2570 | 2580 | 2620 | 2050 | 1860 |
| Laminated structure: unidirectional | Charpy impact strength (kJ/m²) | 267 | 273 | 269 | 224 | 195 |

(The figures shown relating to resin composition are in parts by weight.)

In the following, evaluation/measuring methods used in Examples 22 to 28 and Comparative Examples 15, 16 will be described.

(1) Solubility Parameter δ (SP Value)

The solubility parameter δ (SP value) was determined from the following expression using the data of the evaporation energy and molar volume of atom or atomic group in the structural formula of the compound to be obtained.

$$\delta = (\Sigma \Delta e_i / \Sigma \Delta v_i)^{1/2}$$

wherein $\Delta e_i$ and $\Delta v_i$ represent the evaporation energy and molar volume of an atom or atomic group, respectively.

The structural formula of the compound to be obtained can be determined by commonly used technique for structural analysis such as IR, NMR or mass spectrometry.

(2) Phosphorus Atom Content in Matrix Resin Composition

Phosphorus atom content in a matrix resin composition was determined by combustion method-colorimetry. Specifically, a fiber-reinforced composite sheet was ignited, the generated gas was allowed to be absorbed into pure water in the form of orthophosphoric acid or any of various condensed phosphoric acids, the condensed phosphoric acid included in the liquid was subjected to oxidation treatment to give orthophosphoric acid, and the phosphorus content was determined by colorimetry. As a reagent for colorimetry, phosphovanadmolybdic acid was employed.

(3) Tpf

The cross section of a fiber-reinforced composite sheet was observed by TEM, and Tpf was determined in accordance with the definition described above.

(4) Density

The density of a fiber-reinforced composite sheet was determined by underwater replacement method at 25° C. in accordance with the procedure described in JIS K 7112.

(5) Modulus in flexure

The modulus in flexure was evaluated in accordance with ASTM D790. Four test pieces were cut out from the approximately flat portion of a fiber-reinforced composite sheet in such a manner that the pieces had their length at the respective angles of 0 degree, 45 degrees, 90 degrees and 135 degrees to the fiber orientation direction on the surface of the composite sheet. The portions of the composite sheet at which the test pieces were cut out were selected in such a manner as to avoid, as much as possible, the portions, such as rib, hinge or uneven portions, to which a certain shape was intentionally provided. When the test pieces included such portions, the portions were cut off before the test pieces were used for testing. The maximum value of the modulus in flexure obtained from the test pieces was used as the modulus in flexure herein.

(6) Flame Retardance

Flame retardance was evaluated by vertical flame retardant test in accordance with UL-94 standards. Five test pieces 12.7±0.1 mm wide and 127±1 mm long were cut out from a molded fiber-reinforced composite sheet. The test pieces were cut out in such a manner that the test pieces had their length in the fiber orientation direction on the surface of the fiber-reinforced composite sheet. The thickness of the test pieces was dealt with as described above; however, in the following examples and comparative examples, the objects of measurement all had a thickness of 1.6 mm or smaller, and thus, measurement was made without adjusting the thickness. The blue flame of a burner which included no yellow tip was adjusted to 19.5 mm (¾ inch) long, and the middle portion of the bottom edge of each test piece held vertically was exposed to the flame for 10 seconds. After 10-second exposure, the test piece was put away from the flame, and the flame-out time of the test piece was recorded. After the flame-out, the test piece was again exposed to the flame for 10 seconds. After the second exposure, the test piece was put away from the flame, and the burning time was measured. The flame retardance was ranked in the following manner, based on the state of burning.

V-0: The total time spent by the five test pieces on continuing burning, after their contact with the flame until their flame-out, when they are exposed to flame twice, is 50 seconds or shorter, the time spent by each test piece on continuing burning after its contact with the flame until its flame-out is 10 seconds or shorter, and there is no flame drip.

V-1: A rank lower than rank V-0. The total time spent by the five test pieces on continuing burning, after their contact with the flame until their flame-out, when they are exposed to flame twice, is 250 seconds or shorter, the time spent by each test piece on continuing burning after its contact with the flame until its flame-out is 30 seconds or shorter, and there is no flame drip.

V-2: The total time spent by the five test pieces on continuing burning, after their contact with the flame until their flame-out, when they are exposed to flame twice, is 250 seconds or shorter, the time spent by each test piece on continuing burning after its contact with the flame until its flame-out is 30 seconds or shorter, but there is flame drip.

OUT: The total time spent by the five test pieces on continuing burning, after their contact with the flame until their flame-out, when they are exposed to flame twice, is longer than 250 seconds, or the time spent by any one of the test pieces on continuing burning after its contact with the flame until its flame-out is longer than 30 seconds, or any one of the test pieces is burnt to its holding portion.

The ranking of flame retardance is as follows: V-0>V-1>V-2>OUT

The flame retardance was evaluated for "another member (II)" in the same manner as above.

(7) Electromagnetic Wave Shielding Properties

The electromagnetic wave shielding properties were evaluated by ADVANTEST method. A flat sheet 120 mm×120 mm was cut out from a fiber-reinforced composite sheet and used as a test piece. Before evaluation, the test piece was brought to the absolute dry state (moisture content: 0.1% or lower) and its 4 sides were coated with a conductive paste (DOTITE manufactured by FUJIKURA KASEI CO., LTD.), and the conductive paste was fully dried.

The test piece was inserted into a shielding box and the electromagnetic wave shielding capacity (unit: dB) was determined using spectrum analyzer at a frequency of 1 GHz. The larger the value, the better the shielding properties.

(8) Bonding Strength in the Vertical Direction

Figure 3:
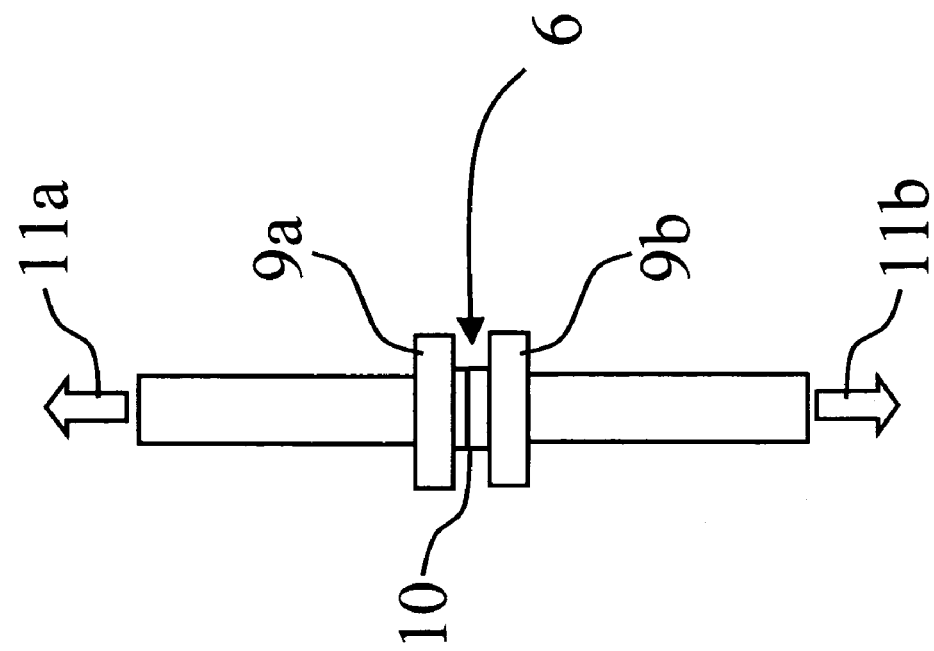
FIG. 3 is a schematic diagram of apparatus for evaluation of bonding strength in the vertical direction.

Samples 10 mm×10 mm for the evaluation of bonding strength in the vertical direction (FIG. 3) were cut out from the portion of an integrated molding at which a fiber-reinforced composite sheet and "another member (ii)" were joined.

Then, the sample was fixed between jigs ($9a$, $9b$ in FIG. 4) of a measurement apparatus. Measurement was made using Instron (registered trademark) 5565 Universal Tensile Tester (INSTRON JAPAN CO., LTD.). When the sample can be chucked by the chuck of Instron, tensile test was conducted with the sample chucked by the chuck of Instron. When the sample cannot be chucked by the chuck of Instron, the molding, as a sample, was coated with an adhesive (Three Bond 1782, manufactured by Three Bond Co., Ltd.) and left to stand at 23±5° C., 50±5% RH for 4 hours to allow the molding to adhere to the jigs.

The tensile test was carried out at an atmospheric temperature of 25° C. in a laboratory where atmospheric temperature could be controlled. Before carrying out the tensile test, the test piece was kept in the laboratory for at least 5 minutes in such a state that no load of tensile test was applied and thermo couple was arranged on the test piece. When the thermocouple confirmed that the temperature of the test piece was equal to the atmospheric temperature, the tensile test was started.

The tensile test was carried out in such a manner as to pull the sample at an angle of 90° to the bonded surface of the fiber-reinforced composite sheet and "another member (II)" at a tensile speed of 1.27 mm/min. And the value obtained by dividing the maximum load applied by the area of the bonded surface was used as the bonding strength in the vertical direction (unit: MPa). The number of samples was n=5.

Example 22

A resin composition, a prepreg and a fiber-reinforced composite sheet were prepared in the same manner as in Example 2, provided that "OMICURE" was used, as a curing accelerator, instead of DCMU. The properties were evaluated for the resultant resin composition, a prepreg and fiber-reinforced composite sheet in accordance with the above described procedure. The evaluation showed that the resultant resin composition was curable at 150° C. in 3 minutes and the flame retardance and mechanical properties of the composite material was as good as those of Example 2. The flame retardance was V-0 not only for test pieces of laminate having thickness of about 0.6 mm, but for test pieces having a thickness of about 0.4 mm and of about 0.2 mm.

Example 23

A resin composition, a prepreg and a fiber-reinforced composite sheet were prepared in the same manner as in Example 22, provided that a red phosphorus flame-retardant, "NOVAEXCEL" 140, was used instead of "NOVARED" 120 and the amount was increased. The properties were evaluated for the resultant resin composition, a prepreg and fiber-reinforced composite sheet in accordance with the above described procedure. The evaluation showed that the resultant resin composition was curable at 150° C. in 3 minutes and the flame retardance and mechanical properties of the composite material was as good as those of Example 22.

Comparative Example 15

A resin composition, a prepreg and a fiber-reinforced composite sheet were prepared in the same manner as in Examples 22, 23; provided that no phosphorus compound was added. The properties were evaluated for the resultant resin composition, a prepreg and fiber-reinforced composite sheet in accordance with the above described procedure. The flame retardance was rejected.

Examples 24 to 26

Resin compositions, a prepreg and fiber-reinforced composite sheets were prepared in the same manner as in Example 15, provided that "OMICURE" 24 or "OMICURE" 52 was used, as a curing accelerator, instead of DCMU and a phosphorus compound CR-733S (resorcinol phosphate) was added at a ratio as shown in Table 6. The properties were evaluated for the resultant resin compositions, a prepreg and fiber-reinforced composite sheets in accordance with the above described procedure. The evaluation showed that the resultant resin compositions were curable at 150° C. in 3 minutes and mechanical properties of the composite material was as good as those of Example 15. The flame retardance was V-0 not only for test pieces of laminate having a thickness of about 0.6 mm, but for test pieces of the laminate having a thickness of about 0.4 mm and of about 0.2 mm.

Example 27

The resin composition prepared by the formulation shown in Table 6 was warmed to 60° C., injected using a resin injector into a mold which had been heated to 150° C. and in which a required number of carbon fiber woven clothes had been placed, cured for 3 minutes, and molded into a laminate by resin transfer molding. In the resultant composite material, the tensile strength and Charpy impact strength were slightly inferior to those of the composite material of Example 24, which was prepared using a prepreg, but the flame retardance was as good as V-0 for the laminate having any thickness.

Comparative Example 16

A resin composition, a prepreg and a fiber-reinforced composite material were prepared in the same manner as in Example 6, provided that antimony trioxide was used instead of a red phosphorus flame-retardant, "NOVARED" 120, and a brominated epoxy resin, "Epicron" 152, was used instead of part of "Epicoat" 1001. The evaluation of the properties made for the resultant resin composition, a prepreg and fiber-reinforced composite material in accordance with the above described procedure was as follows. The mechanical properties, such as 0° modulus in flexure, were the same as those of Example 6. The flame retardance was V-1, V-0 for the test pieces of the laminate having a thickness of about 0.6 mm. The tackiness of a prepreg was so high that a prepreg was hard to handle. The specific gravity of the cured resin was as high as 1.4 and that of the composite material as high as 1.64.

TABLE 6

|  |  | Example 22 | Example 23 | Example 24 | Example 25 |
|---|---|---|---|---|---|
| Epoxy resin (Component [A]) | "Epicoat" 807 |  |  |  |  |
|  | "Epicoat" 828 | 20 | 20 | 20 | 20 |
|  | "Epicoat" 834 | 20 | 20 | 20 | 20 |
|  | "Epicoat" 1001 | 25 | 25 | 25 | 25 |
|  | "Epicoat" 1004AF |  |  |  |  |
|  | "Epicoat" 154 | 35 | 35 | 35 | 35 |
|  | "Epicoat" 604 |  |  |  |  |
|  | "AER" XAC4151 |  |  |  |  |
| Amine curing agent (Component [B]) | Dicy7 | 4 | 4 | 4 | 4 |
| Phosphorus compound (Component [C]) | "NOVARED" 120 | 6 |  |  |  |
|  | "NOVAEXCEL" 140 |  | 10 |  |  |
|  | "NOVAEXCEL" F5 |  |  |  |  |
|  | CDP |  |  |  |  |
|  | CR-733S |  |  | 20 | 25 |
| Curing accelerator (Component [D]) | DCMU-99 |  |  |  |  |
|  | "OMICURE" 24 |  |  | 5 | 5 |
|  | "OMICURE" 52 | 7 | 7 |  |  |
| Thermoplastic resin | "Vinylec" K | 5 | 5 | 5 | 5 |
| Bromine flame-retardant | "Epicron" 152 |  |  |  |  |
| Flame-retardant assistant | Antimony trioxide |  |  |  |  |
| Other flame-retardant | Magnesium oxide |  |  |  |  |
| Phosphorus content of resin composition (wt %) |  | 4.2 | 7.3 | 1.8 | 2 |
| Viscosity of resin (Pa · s, 60° C.) |  | 147 | 152 | 119 | 123 |
| Tackiness of prepreg (◯◯: good, ◯: no trouble in handling, X: trouble in handling) |  | ◯◯ | ◯◯ | ◯◯ | ◯◯ |
| Resin curing/composite material molding conditions | Curing/molding temperature | 150° C. | 150° C. | 150° C. | 150° C. |
|  | Curing/molding time | 3 min | 3 min | 3 min | 3 min |
| Properties of cured resin sheet | Specific gravity | 1.256 | 1.282 | 1.215 | 1.232 |

TABLE 6-continued

|  |  |  |  |  |  |
|---|---|---|---|---|---|
|  | Curability Cured at 150° C. in 10 min | ○ | ○ | ○ | ○ |
|  | Cured at 150° C. in 30 min | ○ | ○ | ○ | ○ |
| Properties of composite material | Tg (° C.) | 141 | 142 | 138 | 136 |
| Laminated structure: (0/45/90)s | Specific gravity | 1.583 | 1.595 | 1.565 | 1.57 |
|  | Fiber volume fraction (%) | 59 | 60.5 | 60.5 | 61 |
|  | Thickness of laminated sheet (mm) | 0.61 | 0.62 | 0.6 | 0.59 |
|  | Flame retardance | V-0 | V-0 | V-0 | V-0 |
| Properties of composite material | Thickness of laminated sheet (mm) | 0.4 | 0.41 | 0.4 | 0.4 |
| Laminated structure: (0/90)s | Flame retardance | V-0 | V-0 | V-0 | V-0 |
| Properties of composite material | Thickness of laminated sheet (mm) | 0.2 | 0.21 | 0.2 | 0.19 |
| Laminated structure: (0/0) | Flame retardance | V-0 | V-0 | V-1 | V-0 |
| Properties of composite material | 0° tensile strength (MPa) | 2580 | 2560 | 2620 | 2600 |
| Laminated structure: unidirectional | Charpy impact strength (kJ/m$^2$) | 278 | 285 | 310 | 310 |

|  |  | Example 26 | Example 27 | Comparative Example 15 | Comparative Example 16 |
|---|---|---|---|---|---|
| Epoxy resin (Component [A]) | "Epicoat" 807 |  |  |  |  |
|  | "Epicoat" 828 | 20 | 100 | 20 | 20 |
|  | "Epicoat" 834 | 20 |  | 20 | 15 |
|  | "Epicoat" 1001 | 25 |  | 25 | 25 |
|  | "Epicoat" 1004AF |  |  |  |  |
|  | "Epicoat" 154 | 35 |  | 35 | 35 |
|  | "Epicoat" 604 |  |  |  |  |
|  | "AER" XAC4151 |  |  |  |  |
| Amine curing agent (Component [B]) | Dicy7 | 4 | 4 | 4 | 4 |
| Phosphorus compound (Component [C]) | "NOVARED" 120 |  |  |  |  |
|  | "NOVAEXCEL" 140 |  |  |  |  |
|  | "NOVAEXCEL" F5 |  |  |  |  |
|  | CDP |  |  |  |  |
|  | CR-733S | 35 | 20 |  |  |
| Curing accelerator (Component [D]) | DCMU-99 |  |  |  |  |
|  | "OMICURE" 24 |  | 5 |  | 5 |
|  | "OMICURE" 52 | 7 |  | 7 |  |
| Thermoplastic resin | "Vinylec" K | 5 |  | 5 | 5 |
| Bromine flame-retardant | "Epicron" 152 |  |  |  | 15 |
| Flame-retardant assistant | Antimony trioxide |  |  |  | 10 |
| Other flame-retardant | Magnesium oxide |  |  |  |  |
| Phosphorus content of resin composition (wt %) |  | 4.6 | 1.7 | 0 | 0 |
| Viscosity of resin (Pa · s, 60° C.) |  | 132 | 2.1 | 141 | 98 |
| Tackiness of prepreg (○○: good, ○: no trouble in handling, X: trouble in handling) |  | ○○ | — | X (excess) | X (excess) |
| Resin curing/composite material molding conditions | Curing/molding temperature | 150° C. | 150° C. | 150° C. | 150° C. |
|  | Curing/molding time | 3 min | 3 min | 30 min | 30 min |
| Properties of cured resin sheet | Specific gravity | 1.239 | 1.21 | 1.23 | 1.4 |
|  | Curability Cured at 150° C. in 10 min | ○ | ○ | ○ | X |
|  | Cured at 150° C. in 30 min | ○ | ○ | ○ | ○ |
| Properties of composite material | Tg (° C.) | 134 | 131 | 138 | 143 |
| Laminated structure: (0/45/90)s | Specific gravity | 1.581 | 1.56 | 1.58 | 1.64 |
|  | Fiber volume fraction (%) | 60 | 59 | 60 | 60.5 |
|  | Thickness of laminated sheet (mm) | 0.61 | 0.62 | 0.6 | 0.62 |
|  | Flame retardance | V-0 | V-0 | rejected | V-1 |
| Properties of composite material | Thickness of laminated sheet (mm) | 0.41 | 0.4 | 0.4 | 0.42 |
| Laminated structure: (0/90)s | Flame retardance | V-0 | V-0 | rejected | rejected |
| Properties of composite material | Thickness of laminated sheet (mm) | 0.2 | 0.2 | 0.2 | 0.21 |
| Laminated structure: (0/0) | Flame retardance | V-0 | V-0 | rejected | rejected |
| Properties of composite material | 0° tensile strength (MPa) | 2580 | 2390 | 2550 | 2430 |
| Laminated structure: unidirectional | Charpy impact strength (kJ/m$^2$) | 305 | 254 | 274 | 255 |

(The figures shown relating to resin composition are in parts by weight.)

Resin compositions, a prepreg and fiber-reinforced composite sheets of Examples 22 to 27 had superior mechanical properties, light weight and flame retardance. The composite materials can be suitably used for casings of personal computers or members of cellular phones. The composite material of Example 25 was particularly superior in light weight because it used an incombustible foam.

The fiber-reinforced composite sheets of Comparative Examples 15, 16 were inferior in flame retardance. Thus, their application is limited.

In the following, the evaluation/measuring methods used in Examples 29 to 40 and Comparative Examples 17 to 19 will be described.

(9) Evaluation of Tmax

First, the glass transition temperature of a fiber-reinforced composite sheet was evaluated in accordance with the procedure described in (3). The fiber-reinforced composite sheet was subjected to after-cure at a temperature of the glass transition temperature+20° C. for 1 hour. The presence or absence of the residual exotherm of the fiber-reinforced composite sheet having undergone after-cure was confirmed by DSC. After the confirmation of the absence of the residual exotherm, the glass transition temperature was evaluated in accordance with the procedure described in (3) and the value was used as Tmax.

(10) ISO4587 Bonding Strength

Test pieces used for measurement of bonding strength were prepared by the procedure described below.

Figure 6:
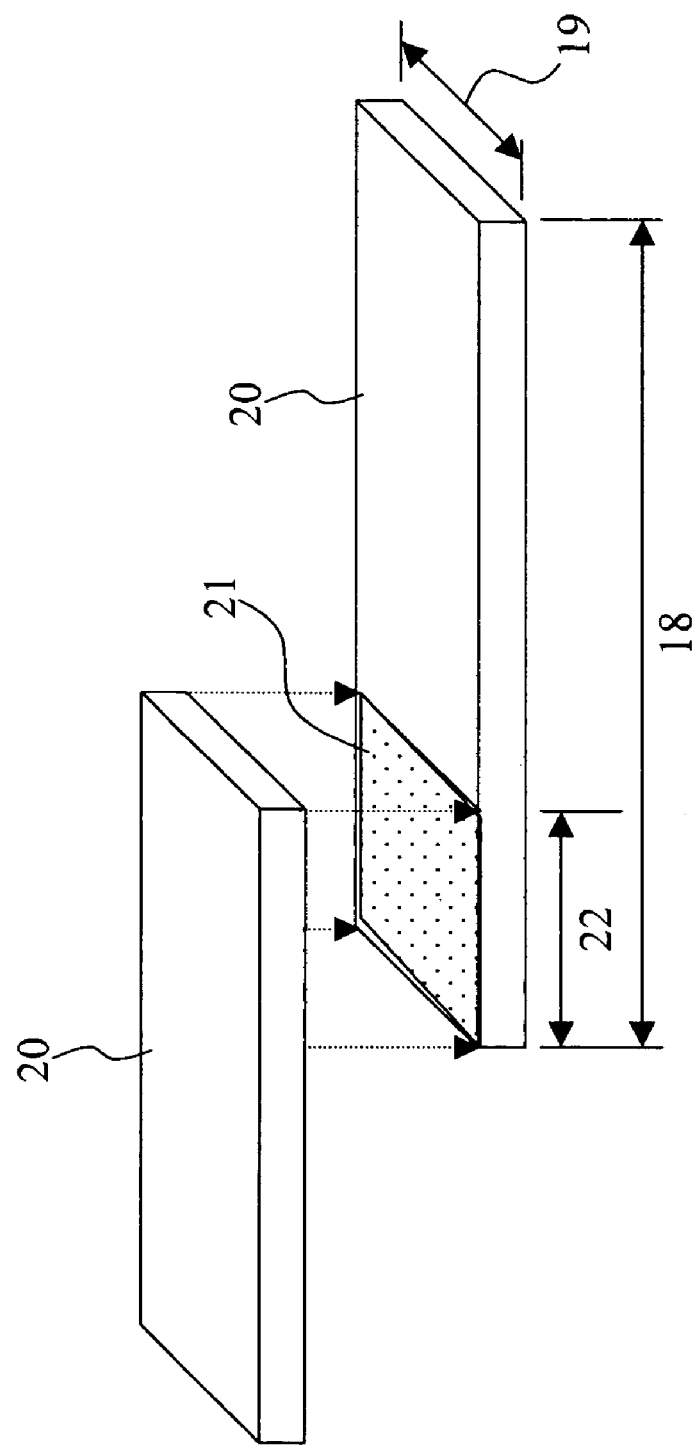
FIG. 6 represents a sample for evaluation of bonding strength in the vertical direction.

The shape and the size of test pieces were in accordance with ISO4587 and are shown in FIG. 6. The length, which is denoted with reference numeral 18 in FIG. 6, was 100 mm and the width, which is denoted with reference numeral 19, was 25 mm. Two test pieces, as denoted with reference numeral 20 in FIG. 6, were prepared. When it is difficult to cut out test pieces having such a size from a fiber-reinforced composite sheet, test pieces may be used which have the same shape as that of FIG. 6 but have a reduced size.

Two test pieces 20 prepared were allowed to face each other so that the coating layer, which contained thermoplastic resin as a major component, of each test piece was to be a joining portion. The length 22 of the joining portion 21 was 12.5 mm. The two test pieces 20 were heated until the temperature of the resin contained in the coating layer reached its melting point so that they could be bonded, and the bonded pieces were cooled while being clamped. The resultant article was used as a test piece for tensile test. More specifically, the two test pieces were joined by holding them for 1 minute at a temperature of the melting point of the resin contained in the coating layer +50° C. and a pressure of 0.6 MPa. The resultant article was used for tensile test. The breaking tenacity (kN) was determined after confirming the fracture of the tensile test piece in the vicinity of the joined portion (in the vicinity of the interface of the two pieces), and the value obtained by dividing the breaking tenacity (kN) by the surface area of the joining portion was used as the bonding strength (MPa).

Figure 4:
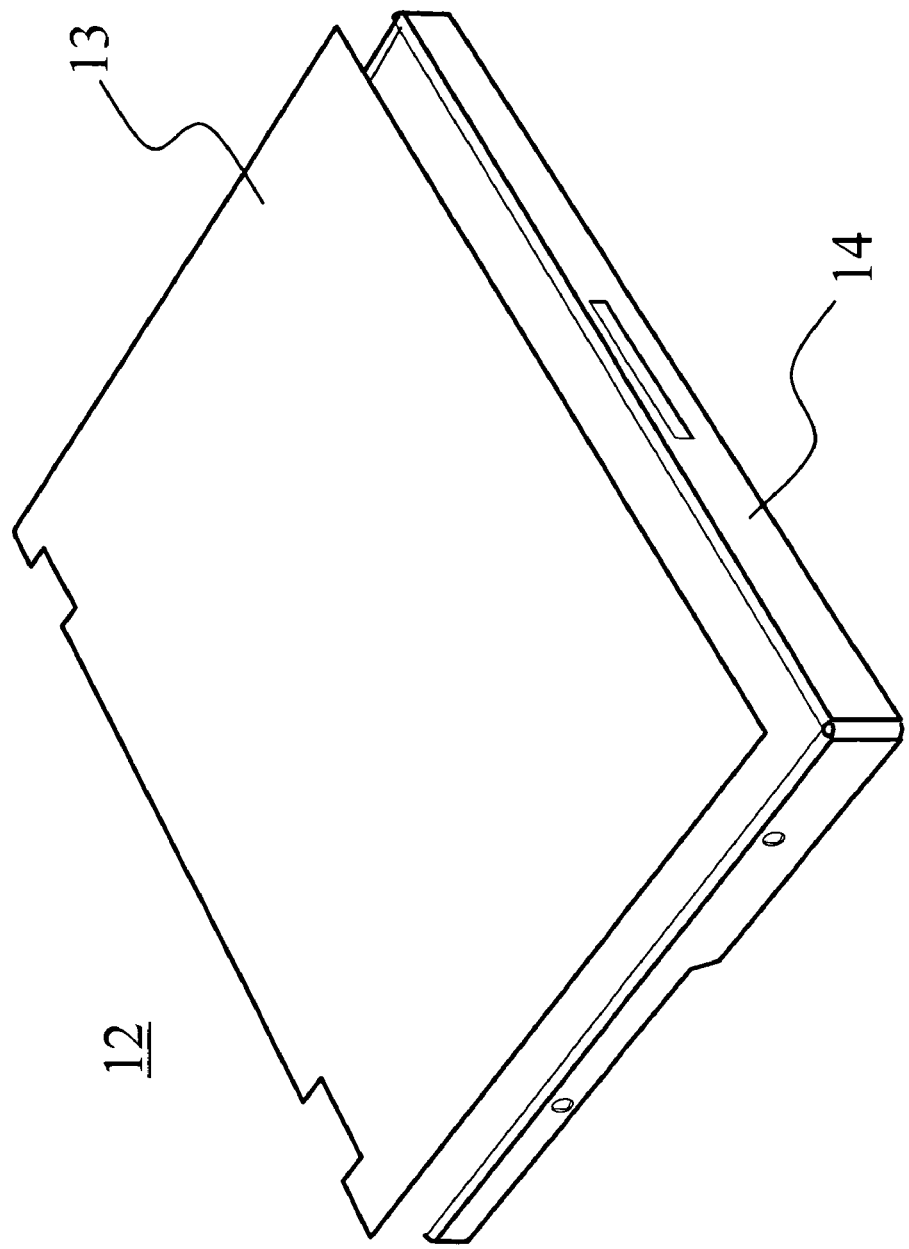
FIG. 4 is a schematic illustration of an integrated molding of a personal computer casing which uses a fiber-reinforced composite sheet of the present invention.
Figure 5:
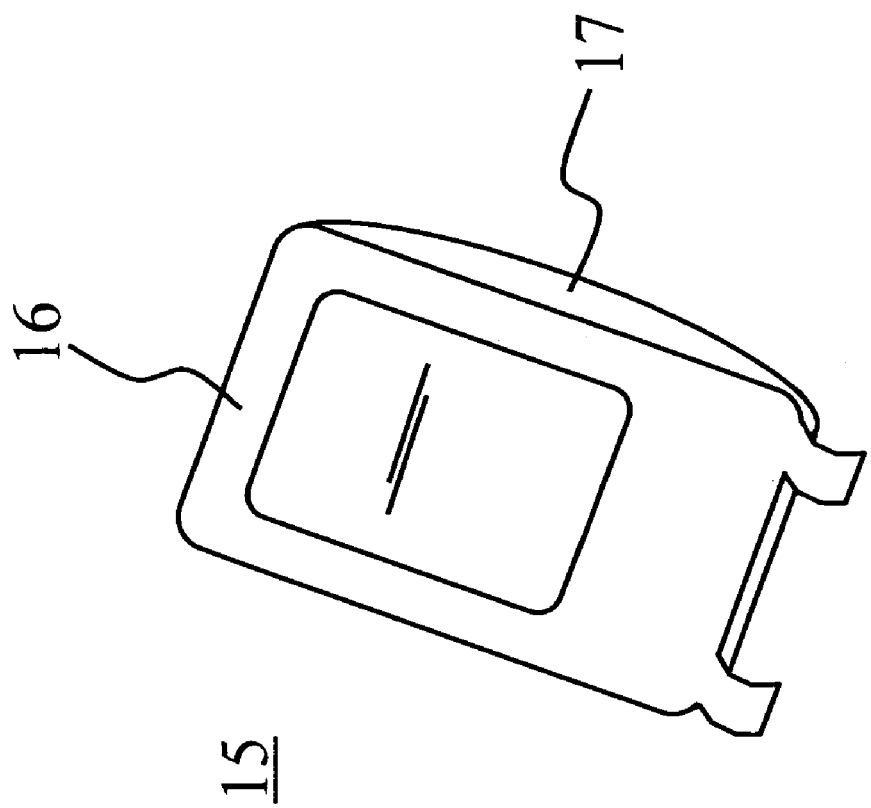
FIG. 5 is a schematic illustration of a cellular phone display casing which uses a composite sheet of the present invention.

A schematic view of a personal computer casing produced in the example of the present invention is shown in FIG. 4 and a schematic view of a cellular phone display in FIG. 5.

Example 28

(Member 1)

A member (I) was produced in the following manner using a prepreg prepared in Example 1.

A plurality of sheets of a prepreg were prepared and laminated to give a laminate structure (0°/90°/0°/0°/90°/0°).

A film 40 μm thick made up of polyamide 6/66/610 terpolymer resin (CM4000, manufactured by Toray Industries, Inc., melting point: 150° C.), was laminated, as a thermoplastic resin for coating layer, on the top of the above a prepreg laminate.

The resultant laminate was preheated in heat pressing machine at 160° C. for 5 minutes to melt the thermoplastic resin and further heated at 150° C. for 30 minutes, while applying a pressure of 0.6 MPa, to cure the epoxy resin. After completion of curing, the laminate was cooled at room temperature, and released from the mold to give a fiber-reinforced composite sheet 0.63 mm thick.

The Tmax of the resultant fiber-reinforced composite sheet was 142° C. and the Tmax−Tg was 2° C.

The flame retardance of the fiber-reinforced composite sheet was V-0, the maximum thickness TpF in the uneven portions of the coating layer was 25 μm and the Tsur was 20 μm. The ISO4587 bonding strength was 25 MPa.

("Another Member (II)" and Integration)

The above fiber-reinforced composite sheet was cut to a prescribed size and inserted into a mold for injection molding of a personal computer casing. Then, "another member (II)" was injection molded, on the surface of the fiber-reinforced composite sheet that includes the thermoplastic resin coating layer, by injecting long-fiber pellets TLP1146 (polyamide resin matrix, carbon fiber content: 20% by weight), manufactured by Toray Industries, Inc., into the above mold so that the "another member (II)" was integrated into the member (I). Thus, a personal computer casing, as an integrated molding, was produced. Injection molding was carried out using injection molder J350EIII, manufactured by The Japan Steel Works, LTD., at a screw revolution speed of 60 rpm, cylinder temperature of 280° C., injection rate of 90 mm/sec, injection pressure of 200 MPa, back pressure of 0.5 MPa, and mold temperature of 55° C. Separately, a second member 1.0 mm thick was molded in the same manner as above and evaluated its flame retardance. The flame retardance was V-0.

The evaluation of the bonding strength in the vertical direction was tried for the resultant integrated molding. At 6 MPa, the portion at which the sample and the jig were fixed with an adhesive was separated before the separation of the joining portion. Thus, the bonding strength in the vertical direction was judged to be 6 MPa or higher.

Example 29

(Member (I))

A fiber-reinforced composite sheet was produced in the same manner as in Example 28 using a prepreg prepared in Example 2.

The thickness of the resultant fiber-reinforced composite sheet was 0.62 mm, the Tmax was 142° C., and the Tmax−Tg was 2° C.

The flame retardance of the fiber-reinforced composite sheet was V-0, the maximum thickness of the unevenness of the coating layer, Tpf, was 25 μm and the Tsur was 20 μm. The ISO4587 bonding strength was 25 MPa.

("Another Member (II)" and Integration)

A personal computer casing, as an integrated molding, was produced in the same manner as in Example 28 using the above fiber-reinforced composite sheet.

The evaluation of the bonding strength in the vertical direction was tried for the resultant integrated molding. At 6 MPa, the portion at which the sample and the jig were fixed with an adhesive was separated before the separation of the joining portion. Thus, the bonding strength in the vertical direction was judged to be 6 MPa or higher.

Example 30

(Member (I))

A fiber-reinforced composite sheet was produced in the same manner as in Example 28 using a prepreg prepared in Example 7.

The thickness of the resultant fiber-reinforced composite sheet was 0.60 mm, the Tmax was 142° C., and the Tmax−Tg was 4° C.

The flame retardance of the fiber-reinforced composite sheet was V-0, the maximum thickness of the unevenness of the coating layer, Tpf, was 25 μm and the Tsur was 20 μm. The ISO4587 bonding strength was 25 MPa.

("Another Member (II)" and Integration)

A personal computer casing, as an integrated molding, was produced in the same manner as in Example 28 using the above fiber-reinforced composite sheet.

The evaluation of the bonding strength in the vertical direction was tried for the resultant integrated molding. At 6 MPa, the portion at which the sample and the jig were fixed with an adhesive was separated before the separation of the joining portion. Thus, the bonding strength in the vertical direction was judged to be 6 MPa or higher.

Example 31

(Member (I))

A fiber-reinforced composite sheet was produced in the same manner as in Example 28 using a prepreg prepared in Example 3.

The thickness of the resultant fiber-reinforced composite sheet was 0.61 mm, the Tmax was 142° C., and the Tmax−Tg was 2° C.

The flame retardance of the fiber-reinforced composite sheet was V-0, the maximum thickness of the unevenness of the coating layer, Tpf, was 25 μm and the Tsur was 20 μm. The ISO4587 bonding strength was 25 MPa.

("Another Member (II)" and Integration)

A personal computer casing, as an integrated molding, was produced in the same manner as in Example 28 using the above fiber-reinforced composite sheet.

The evaluation of the bonding strength in the vertical direction was tried for the resultant integrated molding. At 6 MPa, the portion at which the sample and the jig were fixed with an adhesive was separated before the separation of the joining portion. Thus, the bonding strength in the vertical direction was judged to be 6 MPa or higher.

Example 32

(Member (I))

The fiber-reinforced composite sheet produced in Example 1 was used.

The thickness of the fiber-reinforced composite sheet was 0.63 mm, the Tmax was 142° C., and the Tmax−Tg was 2° C. The flame retardance of the fiber-reinforced composite sheet was V-0.

("Another Member (II)" and Integration)

A metal spacer processed to a prescribed shape was inserted into a mold for injection molding of a personal computer casing, and a second member was produced in the same manner as Example 28 by injection molding. The resultant second member was bonded to the fiber-reinforced composite sheet having been formed to the same prescribed shape as the above metal spacer by coating, as an adhesive, a two-part acrylic adhesive 3921/3926, manufactured by Three Bond Co., Ltd., and left to stand at ordinary temperature for 24 hours to produce a personal computer casing as an integrated molding.

The bonding strength in the vertical direction of the resultant personal computer casing was 5 MPa.

Example 33

(Member (1))

Sheets of a prepreg prepared in Example 1 were laminated to give a laminate structure (0°/90°/0°/90°/0°/0°/90°/0°/90°/0°), and a fiber-reinforced composite sheet was produced in the same manner as in Example 28.

The thickness of the fiber-reinforced composite sheet was 1.05 mm, the Tmax was 142° C., and the Tmax−Tg was 2° C.

The flame retardance of the fiber-reinforced composite sheet was V-0, the maximum thickness of the unevenness of the coating layer, Tpf, was 25 μm. The ISO4587 bonding strength was 25 MPa.

("Another Member (II)" and Integration)

A personal computer casing, as an integrated molding, was produced in the same manner as in Example 28 using the above fiber-reinforced composite sheet.

The evaluation of the bonding strength in the vertical direction was tried for the resultant integrated molding. At 6 MPa, the portion at which the sample and the jig were fixed with an adhesive was separated before the separation of the joining portion. Thus, the bonding strength in the vertical direction was judged to be 6 MPa or higher.

Example 34

(Member (I))

Pellets prepared by mixing 95 parts by weight of a polyamide terpolymer resin, CM4000, and 5 parts by weight of melamine cyanurate salt (MC-440, manufactured by NISSAN CHEMICAL INDUSTRIES, Ltd.) in twin-screw extruder was pressed to form a film 40 μm thick. A fiber-reinforced composite sheet was produced in the same manner as in Example 28, provided that the resultant film was used as a coating layer.

The thickness of the fiber-reinforced composite sheet was 0.64 mm, the Tmax was 142° C., and the Tmax−Tg was 2° C.

The flame retardance of the fiber-reinforced composite sheet was V-0, the maximum thickness of the unevenness of the coating layer, Tpf, was 25 μm and Tsur was 20 μm. The ISO4587 bonding strength was 20 MPa.

("Another Member (II)" and Integration)

A personal computer casing, as an integrated molding, was produced in the same manner as in Example 28 using the above fiber-reinforced composite sheet.

The evaluation of the bonding strength in the vertical direction was tried for the resultant integrated molding. At 6 MPa, the portion at which the sample and the jig were fixed with an adhesive was separated before the separation of the joining portion. Thus, the bonding strength in the vertical direction was judged to be 6 MPa or higher.

Example 35

(Member (I))

Sheets of a prepreg prepared in Example 1 were laminated to give a laminate structure (0°/90°/0°/0°/90°/0°).

A film 40 μm thick made up of a polyamide 6/66/610 terpolymer resin (CM4000, manufactured by Toray Industries, Inc., melting point: 150° C.), as a thermoplastic resin for coating layer, was laminated on the top of the above a prepreg laminate. Further, a film 40 μm thick made up of "Bond fast" (VC-40, melting point 95° C.), manufactured by Sumitomo Chemical Co., Ltd., was laminated on the opposite side (the lowest layer) of a prepreg laminate, as a third member for preventing fine splits from occurring on the surface.

The resultant laminate was preheated in heat pressing machine at 160° C. for 5 minutes to melt the thermoplastic resin and further heated at 150° C. for 30 minutes, while applying a pressure of 0.6 MPa, to cure the epoxy resin. After completion of curing, the laminate was cooled at room temperature and released from the mold to give a fiber-reinforced composite sheet 0.64 mm thick.

The Tmax of the resultant fiber-reinforced composite sheet was 142° C. and the Tmax−Tg was 2° C.

The flame retardance of the fiber-reinforced composite sheet was V-0, the maximum thickness of the unevenness of the coating layer, Tpf, of the same was 25 μm and the Tsur was 20 μm. The ISO4587 bonding strength was 25 MPa.

("Another Member (II)" and Integration)

The above fiber-reinforced composite sheet was inserted into a mold for injection molding, and "another member (II)" was injection molded on the surface, which includes the thermoplastic resin coating layer (polyamide layer), of the fiber-reinforced composite sheet by injecting long-fiber pellets TLP1146 (polyamide resin matrix, carbon fiber content: 20% by weight), manufactured by Toray Industries, Inc., into the above mold so that the "another member (II)" was integrated with the member (I). Thus, a personal computer casing, as an integrated molding, was produced.

The evaluation of the bonding strength in the vertical direction was tried for the resultant integrated molding. At 6 MPa, the portion at which the sample and the jig were fixed with an adhesive was separated before the separation of the joining portion. Thus, the bonding strength in the vertical direction was judged to be 6 MPa or higher.

Example 36

(Member (I))

A fiber-reinforced composite sheet 0.62 mm thick prepared in Comparative Example 8 was used as a member (I).

The Tmax of the resultant fiber-reinforced composite sheet was 150° C. and the Tmax–Tg was 4° C. And the flame retardance of the composite sheet was V-0.

("Another Member (II)" and Integration)

A personal computer casing, as an integrated molding, was produced in the same manner as in Example 32 using the above fiber-reinforced composite sheet. The bonding strength in the vertical direction of the joining portion of the resultant personal computer casing was 5 MPa.

Example 37

(Member (I))

A fiber-reinforced composite sheet prepared in Example 15 was used as a member (I).

The thickness of the fiber-reinforced composite sheet was 0.6 mm, the Tmax was 142° C. and the Tmax–Tg was 3° C.

The flame retardance of the composite sheet was V-0.

("Another Member (II)" and Integration)

A personal computer casing, as an integrated molding, was produced in the same, manner as in Example 32 using the above fiber-reinforced composite sheet. The bonding strength in the vertical direction of the joining portion of the resultant personal computer casing was 5 MPa.

Example 38

(Member (I))

A fiber-reinforced composite sheet prepared in Example 27 was used as a member (I).

The thickness of the fiber-reinforced composite sheet was 0.62 mm, the Tmax was 136° C. and the Tmax–Tg was 5° C.

The flame retardance of the composite sheet was V-0.

("Another Member (II)" and Integration)

A personal computer casing, as an integrated molding, was produced in the same manner as in Example 32 using the above fiber-reinforced composite sheet. The bonding strength in the vertical direction of the joining portion of the resultant personal computer casing was 5 MPa.

Example 39

(Member (I))

A fiber-reinforced composite sheet was prepared in the same manner as Example 28.

The thickness of the fiber-reinforced composite sheet was 0.63 mm, the Tmax was 142° C. and the Tmax–Tg was 2° C.

The flame retardance of the composite sheet was V-0, the maximum thickness of the unevenness of the coating layer, Tpf, was 25 μm and Tsur was 20 μm. The ISO4587 bonding strength was 25 MPa.

("Another Member (II)" and Integration)

The above fiber-reinforced composite sheet was cut to a prescribed size and inserted into a mold for injection molding of a cellular phone display casing. And a cellular phone display casing, as an integrated molding, was produced in the same manner as in Example 28.

The evaluation of the bonding strength in the vertical direction was tried for the resultant integrated molding. At 6 MPa, the portion at which the sample and the jig were fixed with an adhesive was separated before the separation of the joining portion. Thus, the bonding strength in the vertical direction was judged to be 6 MPa or higher.

Example 40

(Member (I))

A fiber-reinforced composite sheet was prepared in the same manner as Example 28.

The thickness of the fiber-reinforced composite sheet was 0.63 mm, the Tmax was 142° C. and the Tmax–Tg was 2° C.

The flame retardance of the composite sheet was V-0, the maximum thickness of the unevenness of the coating layer, Tpf, was 25 μm and Tsur was 20 μm. The ISO4587 bonding strength was 25 MPa.

("Another Member (II)" and Integration)

Separately, a second member was formed by injection molding using long-fiber pellets TLP1146, manufactured by Toray Industries, Inc. The above fiber-reinforced composite sheet was cut to a prescribed size and integrated with the second member using ultrasonic welder at a frequency of 20 kHz and a pressure of 1 MPa to produce a cellular phone display casing. The two members were integration so that the second member was in contact with the thermoplastic resin coating layer of the fiber-reinforced composite sheet.

The evaluation of the bonding strength in the vertical direction was tried for the resultant integrated molding. At 6 MPa, the portion at which the sample and the jig were fixed with an adhesive was separated before the separation of the joining portion. Thus, the bonding strength in the vertical direction was judged to be 6 MPa or higher.

Comparative Example 17

(Member (I))

A fiber-reinforced composite sheet was produced in the same manner as in Example 28 using a prepreg prepared in Comparative Example 3.

The thickness of the resultant fiber-reinforced composite sheet was 0.63 mm, the Tmax was 142° C., and the Tmax–Tg was 2° C.

The flame retardance of the fiber-reinforced composite sheet was rejected, the maximum thickness of the unevenness of the coating layer, Tpf, was 25 μm and the Tsur was 20 μm. The ISO4587 bonding strength was 25 MPa.

("Another Member (II)" and Integration)

A personal computer casing, as an integrated molding, was produced in the same manner as in Example 28 using the above fiber-reinforced composite sheet.

The evaluation of the bonding strength in the vertical direction was tried for the resultant integrated molding. At 6 MPa, the portion at which the sample and the jig were fixed with an adhesive was separated before the separation of the joining portion. Thus, the bonding strength in the vertical direction was judged to be 6 MPa or higher.

Comparative Example 18

(Member (I))

A fiber-reinforced composite sheet was produced in the same manner as in Example 28 using a prepreg prepared in Comparative Example 3.

The thickness of the resultant fiber-reinforced composite sheet was 0.63 mm, the Tmax was 142° C., and the Tmax–Tg was 2° C.

The flame retardance of the fiber-reinforced composite sheet was rejected.

("Another Member (II)" and Integration)

Separately, a second member was produced in the same manner as in Example 40.

The above fiber-reinforced composite sheet and the resultant second member were joined to each other by coating, as an adhesive, a two-part acrylic adhesive 3921/3926, manufactured by Three Bond Co., Ltd., and left to stand at ordinary temperature for 24 hours to produce a cellular phone display casing as an integrated molding.

The bonding strength in the vertical direction of the resultant cellular phone display casing was 5 MPa.

Comparative Example 19

(Member (I))

A fiber-reinforced composite sheet was prepared in the same manner as in Example 11, provided that the curing and molting time was 2 minutes.

The thickness of the resultant fiber-reinforced composite sheet was 0.64 mm, the Tmax was 142° C., and the Tmax−Tg was 63° C.

The flame retardance of the fiber-reinforced composite sheet was rejected.

("Another Member (II)" and Integration)

A personal computer casing, as an integrated molding, was produced in the same manner as in Example 32 using the above fiber-reinforced composite sheet. The bonding strength in the vertical direction of the joining portion of the resultant personal computer casing was 5 MPa.

TABLE 7

| | | Example 28 | Example 29 | Example 30 | Example 31 |
|---|---|---|---|---|---|
| First member | | | | | |
| Constituents | Reinforcing fiber | Carbon fiber (67 wt %) | Carbon fiber (67 wt %) | Carbon fiber (67 wt %) | Carbon fiber (67 wt %) |
| | Thermoplastic resin | Epoxy (prepreg) | Epoxy (prepreg) | Rapid cure epoxy (prepreg) | epoxy (prepreg) |
| | Flame-retardant | Red phosphorus | Red phosphorus | Red phosphorus | Red phosphorus |
| | Average particle size | 10-15 μm | 10-15 μm | 10-15 μm | 10-15 μm |
| | Amount added | 3 parts by weight | 6 parts by weight | 6 parts by weight | 10 parts by weight |
| | TP coating layer | CM4000 | CM4000 | CM4000 | CM4000 |
| Properties | Tmax-Tg | 2 | 2 | 4 | 2 |
| | Sheet thickness | 0.6 mm | 0.6 mm | 0.6 mm | 0.6 mm |
| | UL-94 flame retardance | V-0 | V-0 | V-0 | V-0 |
| | ISO4587 bonding strength | 25 MPa | 25 MPa | 25 MPa | 25 MPa |
| | Vertical bonding strength | >6 MPa | >6 MPa | >6 MPa | >6 MPa |
| Second member: Another member (II) | | | | | |
| Constituents | Reinforcing fiber/resin/anything else | TLP material, CF/Ny/red phosphorus | TLP material, CF/Ny/red phosphorus | TLP material, CF/Ny/red phosphorus | TLP material, CF/Ny/red phosphorus |
| Properties | UL-94 flame retardance | V-0 | V-0 | V-0 | V-0 |
| Third member | | — | — | — | — |
| Joining method | | Insert injection molding | Insert injection molding | Insert injection molding | Insert injection molding |
| Applications | | Personal computer casing | Personal computer casing | Personal computer casing | Personal computer casing |
| Remarks | | Red phosphorus amount | Red phosphorus amount | Red phosphorus amount | Red phosphorus amount |

| | | Example 32 | Example 33 | Example 34 | Example 35 |
|---|---|---|---|---|---|
| First member | | | | | |
| Constituents | Reinforcing fiber | Carbon fiber (67 wt %) | Carbon fiber (67 wt %) | Carbon fiber (67 wt %) | carbon fiber (67 wt %) |
| | Thermoplastic resin | epoxy (prepreg) | epoxy (prepreg) | epoxy (prepreg) | epoxy (prepreg) |
| | Flame-retardant | Red phosphorus | Red phosphorus | Red phosphorus | Red phosphorus |
| | Average particle size | 10-15 μm | 10-15 μm | 10-15 μm | 10-15 μm |
| | Amount added | 3 parts by weight | 3 parts by weight | 3 parts by weight | 3 parts by weight |
| | TP coating layer | none | CM4000 | CM4000 (flame-retardant) | CM4000 |
| Properties | Tmax-Tg | 2 | 2 | 2 | 2 |
| | Sheet thickness | 0.6 mm | 1.0 mm | 0.6 mm | 0.6 mm |
| | UL-94 flame retardance | V-0 | V-0 | V-0 | V-0 |
| | ISO4587 bonding strength | — | 25 MPa | 20 MPa | 25 MPa |
| | Vertical bonding strength | 5 MPa | >6 MPa | >6 MPa | >6 MPa |
| Second member: Another member (II) | | | | | |

TABLE 7-continued

| | | | | | |
|---|---|---|---|---|---|
| Constituents | Reinforcing fiber/resin/anything else | TLP material, CF/Ny/red phosphorus | TLP material, CF/Ny/red phosphorus | TLP material, CF/Ny/red phosphorus | TLP material, CF/Ny/red phosphorus |
| Properties | UL-94 flame retardance | V-0 | V-0 | V-0 | V-0 |
| Third member | | — | — | — | Surface film |
| Joining method | | Adhesive | Insert injection molding | Adhesive | Insert injection molding |
| Applications | | Personal computer casing | Personal computer casing | Personal computer casing | Personal computer casing |
| Remarks | | Adhesive | Thickness 1.0 mm | Flame retardance of skin layer | Presence of third member |

TABLE 8

| | | Example 36 | Example 37 | Example 38 | Example 39 |
|---|---|---|---|---|---|
| First member | | | | | |
| Constituents | Reinforcing fiber | carbon fiber (67 wt %) | carbon fiber (67 wt %) | carbon fiber (67 wt %) | carbon fiber (67 wt %) |
| | Thermoplastic resin | Epoxy (prepreg) | Epoxy (prepreg) | Epoxy (RTM) | Epoxy (prepreg) |
| | Flame-retardant | Brominated epoxy | Phosphate ester | Phosphate ester | Red phosphorus |
| | Average particle size | — | — | — | 10-15 μm |
| | Amount added | 30 parts by weight | 20 parts by weight | 20 parts by weight | 3 parts by weight |
| | TP coating layer | none | none | none | CM4000 |
| Properties | Tmax-Tg | 4 | 3 | 5 | 2 |
| | Sheet thickness | 0.6 mm | 0.6 mm | 0.6 mm | 0.6 mm |
| | UL-94 flame retardance | V-0 | V-0 | V-0 | V-0 |
| | ISO4587 bonding strength | — | — | — | 25 MPa |
| | Vertical bonding strength | 5 MPa | 5 MPa | 5 MPa | >6 MPa |
| Second member: Another member (II) | | | | | |
| Constituents | Reinforcing fiber/resin/anything else | TLP material, CF/Ny/red phosphorus | TLP material, CF/Ny/red phosphorus | TLP material, CF/Ny/red phosphorus | TLP material, CF/Ny/red phosphorus |
| Properties | UL-94 flame retardance | V-0 | V-0 | V-0 | V-0 |
| Third member | | — | — | — | — |
| Joining method | | Adhesive | Adhesive | Adhesive | Insert injection molding |
| Applications | | personal computer casing | personal computer casing | personal computer casing | Cellular phone |
| Remarks | | Brominated epoxy | Phosphate ester | RTM molding | |

| | | Example 40 | Comparative Example 17 | Comparative Example 18 | Comparative Example 19 |
|---|---|---|---|---|---|
| First member | | | | | |
| Constituents | Reinforcing fiber | carbon fiber (67 wt %) | carbon fiber (67 wt %) | carbon fiber (67 wt %) | carbon fiber (67 wt %) |
| | Thermoplastic resin | Epoxy (prepreg) | Epoxy (prepreg) | Epoxy (prepreg) | Rapid cure epoxy (prepreg) |
| | Flame-retardant | Red phosphorus | none | none | Red phosphorus |
| | Average particle size | 10-15 μm | — | — | 10-15 μm |
| | Amount added | 3 parts by weight | — | — | 6 parts |
| | TP coating layer | CM4000 | CM4000 | none | none |
| Properties | Tmax-Tg | 2 | 2 | 2 | 63 |
| | Sheet thickness | 0.6 mm | 0.6 mm | 0.6 mm | 0.6 mm |
| | UL-94 flame retardance | V-0 | V-OUT | V-OUT | V-OUT |
| | ISO4587 bonding strength | 25 MPa | 25 MPa | 25 MPa | — |
| | Vertical bonding strength | >6 MPa | >6 MPa | 5 MPa | 5 MPa |
| Second member: Another member (II) | | | | | |
| Constituents | Reinforcing fiber/resin/anything else | TLP material, CF/Ny/red phosphorus | TLP material, CF/Ny/red phosphorus | TLP material, CF/Ny/red phosphorus | TLP material, CF/Ny/red phosphorus |
| Properties | UL-94 flame retardance | V-0 | V-0 | V-0 | V-0 |

TABLE 8-continued

| Third member | — | — | — | — |
|---|---|---|---|---|
| Joining method | Ultrasonic welding | Insert injection molding | Adhesive | Adhesive |
| Applications | Cellular phone | personal computer casing | Cellular phone | personal computer casing |
| Remarks | Ultrasonic welding | No flame-retardant | No flame-retardant | Insufficient progress of curing |

As sown above, for flame retardance, fiber-reinforced composite sheets of Examples 28 to 40 were excellent, while those of Comparative Examples 17 to 19 were poor.

The invention claimed is:

1. An epoxy resin composition for carbon-fiber-reinforced composite materials, comprising the following components [A], [B], [C], [D] and [E]:
   [A] epoxy resin,
   [B] amine curing agent which is dicyandiamide,
   [C] phosphorus compound,
   [D] curing accelerator which is 1,1'-(4- methyl-m-phenylene)bis(3,3-dimethylurea) and,
   [E] thermoplastic resin;
   wherein component [C] is present in an amount such that the resin composition has a phosphorus atom concentration of 0.2 to 15% by weight; and
   wherein components [A], [B], [C], [D], and [E] are present in amounts such that the combined amount of components [A], [B], [C], [D], and [E] is at least 95% by weight, based on the overall resin composition.

2. The epoxy resin composition for carbon-fiber-reinforced composite materials according to claim 1, wherein the resin composition has a viscosity of 10 to 700 Pa's at 60° C.

3. The epoxy resin composition for carbon-fiber-reinforced composite materials according to claim 1, wherein component [C] comprises red phosphorus.

4. The epoxy resin composition for carbon-fiber-reinforced composite materials according to claim 3, wherein the red phosphorus is coated with a metal hydroxide, a resin or a combination thereof.

5. The epoxy resin composition for carbon-fiber-reinforced composite materials according to claim 1, wherein the resin composition has a specific gravity of 1.35 or lower.

6. The epoxy resin composition for carbon-fiber-reinforced composite materials according to claim 1, wherein the resin composition is capable of being cured within 30 minutes at 150° C.

7. A prepreg, prepared by impregnating carbon fiber with the epoxy resin composition for carbon-fiber-reinforced composite materials according to claim 1.

8. The prepreg according to claim 7, wherein the prepreg has a fiber volume content of 30 to 95%.

9. The prepreg according to claim 7, wherein the prepreg is a woven prepreg or a unidirectional prepreg.

10. A fiber-reinforced composite material, prepared by laminating a plurality of prepregs according to claim 9 and curing said laminate.

11. A fiber-reinforced composite material, prepared by curing the prepreg according to claim 7.

* * * * *